(12) United States Patent
Fisher et al.

(10) Patent No.: US 9,747,006 B2
(45) Date of Patent: Aug. 29, 2017

(54) SYSTEMS AND METHODS FOR IMPLEMENTING MULTI-APPLICATION TABS AND TAB SETS

(71) Applicant: salesforce.com, inc., San Francisco, CA (US)

(72) Inventors: Steve Fisher, Los Altos, CA (US); Eric David Bezar, Oakland, CA (US); Adam Gross, San Francisco, CA (US); Ian Swinson, Oakland, CA (US); George Hu, San Francisco, CA (US); Yoshiyuki Oikawa, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 252 days.

(21) Appl. No.: 13/862,072

(22) Filed: Apr. 12, 2013

(65) Prior Publication Data

US 2013/0227443 A1 Aug. 29, 2013

Related U.S. Application Data

(63) Continuation of application No. 12/831,072, filed on Jul. 6, 2010, now Pat. No. 8,701,024, which is a
(Continued)

(51) Int. Cl.
*G06F 17/30* (2006.01)
*G06F 3/0481* (2013.01)
*G06F 3/0484* (2013.01)

(52) U.S. Cl.
CPC ......... *G06F 3/0484* (2013.01); *G06F 3/0481* (2013.01); *G06F 17/30528* (2013.01); *G06F 17/30994* (2013.01)

(58) Field of Classification Search
CPC .......... G06F 17/3089; G06F 17/30893; G06F 17/30884; G06Q 30/02
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

CN 101427208 A 5/2009
JP 2004192641 A 7/2004
(Continued)

OTHER PUBLICATIONS

NetCaptor 7, www.netcaptor.com/tour/, as evidenced by Archive. org at https://web.archive.org/web/20050207214736/http://www.netcaptor.com/tour/, Jan. 23-Feb. 10, 2005, pp. 1-10.*
(Continued)

*Primary Examiner* — Andrew Tank
(74) *Attorney, Agent, or Firm* — Haynes Beffel & Wolfeld LLP; Ernest J. Beffel, Jr.

(57) ABSTRACT

A sharing model enables users to easily and conveniently create and share standard and custom database objects, and applications, among users or groups of users. The sharing model includes systems and methods that allow users to conveniently create and customize tabs and tab sets that define relationships between custom objects and fields, standard objects and fields, and applications. A tab visually represents a user interface into an element of an application or into a database object. Selection of a tab provides a user access to the object or element of the application represented by the tab. A tab set is a group of related tabs that work as a unit to provide application functionality. New tabs and tab sets may be defined and tab set views may be customized so
(Continued)

that an end user can easily and conveniently switch between the various objects and application elements represented by the displayed tabs and tab set views.

33 Claims, 19 Drawing Sheets

Related U.S. Application Data continuation of application No. 11/075,546, filed on Mar. 8, 2005, now Pat. No. 7,774,366.

(58) Field of Classification Search
USPC ............... 715/229, 234–242, 744–747, 760, 715/762–763, 777, 779
See application file for complete search history.

(56) References Cited

U.S. PATENT DOCUMENTS

| | | | |
|---|---|---|---|
| 5,649,104 A | 7/1997 | Carleton et al. | |
| 5,715,415 A | 2/1998 | Dazey et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,914,714 A * | 6/1999 | Brown ................ | G06F 3/0481 715/769 |
| 5,918,159 A | 6/1999 | Fomukong et al. | |
| 5,948,064 A * | 9/1999 | Bertram ................ | H04L 41/12 380/30 |
| 5,963,953 A | 10/1999 | Cram et al. | |
| 6,092,083 A | 7/2000 | Brodersen et al. | |
| 6,133,912 A * | 10/2000 | Montero ................ | 715/716 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,243,088 B1 | 6/2001 | McCormack et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,330,007 B1 | 12/2001 | Isreal et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,567,846 B1 | 5/2003 | Garg et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,603,488 B2 | 8/2003 | Humpleman et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,675,350 B1 | 1/2004 | Abrams et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,745,238 B1 * | 6/2004 | Giljum et al. ................ | 709/219 |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,823,330 B1 * | 11/2004 | Calvillo et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,934,697 B1 * | 8/2005 | Warren | |
| 7,035,838 B2 | 4/2006 | Nelson et al. | |
| 7,039,606 B2 | 5/2006 | Hoffman et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,111,243 B1 | 9/2006 | Ballard et al. | |
| 7,131,069 B1 | 10/2006 | Rush et al. | |
| 7,134,083 B1 * | 11/2006 | Guerrero ................ | 715/760 |
| 7,181,758 B1 | 2/2007 | Chan | |
| 7,225,409 B1 * | 5/2007 | Schnarel et al. ............... | 715/747 |
| 7,263,597 B2 * | 8/2007 | Everdell et al. ................ | 712/11 |
| 7,289,976 B2 | 10/2007 | Kihneman et al. | |
| 7,305,470 B2 * | 12/2007 | Tom et al. ..................... | 709/225 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,412,655 B2 * | 8/2008 | Wada et al. .................... | 715/744 |
| 7,475,346 B1 * | 1/2009 | Bullock et al. ................ | 709/203 |
| 7,508,789 B2 | 3/2009 | Chan | |
| 7,580,568 B1 * | 8/2009 | Wang et al. ................... | 382/173 |
| 7,581,011 B2 | 8/2009 | Teng | |
| 7,603,483 B2 | 10/2009 | Psounis et al. | |
| 7,620,655 B2 | 11/2009 | Larsson et al. | |
| 7,673,243 B2 * | 3/2010 | Keohane et al. ............... | 715/738 |
| 7,698,160 B2 | 4/2010 | Beaven et al. | |
| 7,707,505 B1 * | 4/2010 | Ohrt et al. ..................... | 715/738 |
| 7,757,088 B2 * | 7/2010 | Abdulhayoglu ............... | 713/175 |
| 7,774,366 B2 | 8/2010 | Fisher et al. | |
| 7,779,039 B2 | 8/2010 | Weissman et al. | |
| 7,779,475 B2 | 8/2010 | Jakobson et al. | |
| 7,783,979 B1 * | 8/2010 | Leblang et al. ............... | 715/739 |
| 7,851,004 B2 | 12/2010 | Hirao et al. | |
| 7,921,365 B2 * | 4/2011 | Sauve et al. ................... | 715/738 |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,078,615 B2 * | 12/2011 | Smith et al. ................... | 707/732 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,280,946 B1 * | 10/2012 | Badros ........................ | 709/203 |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,583,688 B2 | 11/2013 | Fisher et al. | |
| 8,646,103 B2 | 2/2014 | Jakobson et al. | |
| 8,701,024 B2 | 4/2014 | Fisher et al. | |
| 8,713,457 B2 | 4/2014 | Fisher et al. | |

(56) References Cited

U.S. PATENT DOCUMENTS

| | | | |
|---|---|---|---|
| 8,756,275 B2 | 6/2014 | Jakobson | |
| 8,769,004 B2 | 7/2014 | Jakobson | |
| 8,769,017 B2 | 7/2014 | Jakobson | |
| 2001/0035885 A1* | 11/2001 | Iron et al. | 345/855 |
| 2001/0044791 A1 | 11/2001 | Richter et al. | |
| 2001/0051959 A1* | 12/2001 | Penn et al. | 707/513 |
| 2002/0054084 A1* | 5/2002 | Udell | 345/738 |
| 2002/0072951 A1 | 6/2002 | Lee et al. | |
| 2002/0082892 A1 | 6/2002 | Raffel et al. | |
| 2002/0093537 A1* | 7/2002 | Bocioned et al. | 345/777 |
| 2002/0105545 A1* | 8/2002 | Carter et al. | 345/752 |
| 2002/0105548 A1 | 8/2002 | Hayton et al. | |
| 2002/0107746 A1 | 8/2002 | Jacoby | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152254 A1 | 10/2002 | Teng | |
| 2002/0158908 A1* | 10/2002 | Vaajala | G06F 1/1626 715/767 |
| 2002/0162090 A1 | 10/2002 | Parnell et al. | |
| 2002/0163545 A1* | 11/2002 | Hii | 345/838 |
| 2002/0165742 A1 | 11/2002 | Robins | |
| 2002/0165961 A1 | 11/2002 | Everdell et al. | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0030679 A1* | 2/2003 | Jain | 345/854 |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0071849 A1 | 4/2003 | Ferri | |
| 2003/0074418 A1 | 4/2003 | Coker | |
| 2003/0080995 A1* | 5/2003 | Tenenbaum et al. | 345/738 |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0197735 A1 | 10/2003 | Woltzen | |
| 2003/0204427 A1 | 10/2003 | Gune et al. | |
| 2003/0206192 A1 | 11/2003 | Chen et al. | |
| 2003/0221093 A1* | 11/2003 | Touchet | 713/1 |
| 2003/0225730 A1 | 12/2003 | Warner et al. | |
| 2003/0233425 A1* | 12/2003 | Lyons et al. | 709/217 |
| 2004/0001092 A1 | 1/2004 | Rothwein et al. | |
| 2004/0010489 A1 | 1/2004 | Rio | |
| 2004/0012628 A1* | 1/2004 | Kropf et al. | 345/744 |
| 2004/0015981 A1 | 1/2004 | Coker et al. | |
| 2004/0024608 A1 | 2/2004 | Saenz et al. | |
| 2004/0027388 A1 | 2/2004 | Berg et al. | |
| 2004/0061720 A1* | 4/2004 | Weber | 345/760 |
| 2004/0093562 A1* | 5/2004 | Diorio et al. | 715/513 |
| 2004/0111387 A1 | 6/2004 | Nelson et al. | |
| 2004/0113941 A1 | 6/2004 | Sliwa et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0010877 A1 | 1/2005 | Udler | |
| 2005/0015730 A1 | 1/2005 | Gunturi et al. | |
| 2005/0050472 A1 | 3/2005 | Faseler et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0114229 A1* | 5/2005 | Ackley et al. | 705/26 |
| 2005/0132297 A1* | 6/2005 | Milic-Frayling et al. | 715/745 |
| 2005/0193347 A1* | 9/2005 | Van Dam | 715/764 |
| 2006/0021019 A1 | 1/2006 | Hinton et al. | |
| 2006/0036966 A1* | 2/2006 | Yevdayev | 715/779 |
| 2006/0112340 A1* | 5/2006 | Mohr | G06F 17/30873 715/733 |
| 2006/0161859 A1 | 7/2006 | Holecek et al. | |
| 2006/0181411 A1 | 8/2006 | Fast et al. | |
| 2006/0184875 A1* | 8/2006 | Okada et al. | 715/516 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0217194 A1 | 8/2009 | Martin et al. | |
| 2009/0281905 A1* | 11/2009 | Walton | 705/26 |
| 2011/0071995 A1 | 3/2011 | Fisher et al. | |
| 2011/0071996 A1 | 3/2011 | Fisher et al. | |
| 2011/0072386 A1 | 3/2011 | Fisher et al. | |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0232429 A1 | 9/2013 | Fisher et al. | |
| 2013/0247216 A1 | 9/2013 | Cinarkaya et al. | |

FOREIGN PATENT DOCUMENTS

| | | |
|---|---|---|
| JP | 2008533593 A | 8/2008 |
| JP | 5058149 B2 | 10/2012 |
| WO | 99/57863 | 11/1999 |
| WO | WO 0167285 A2 * | 9/2001 |
| WO | 01/77787 | 10/2001 |
| WO | 200609672 A1 | 1/2006 |
| WO | 2006/096792 A2 | 9/2006 |
| WO | 2006/096792 A3 | 12/2007 |

OTHER PUBLICATIONS

U.S. Appl. No. 12/831,072—Office Action dated Nov. 19, 2012, 18 pages.
U.S. Appl. No. 12/831,072—Response filed Apr. 19, 2013, 12 pages.
U.S. Appl. No. 12/831,072—Final Office Action dated Jun. 27, 2013, 21 pages.
U.S. Appl. No. 12/831,072—Response filed Oct. 28, 2013. 13 pages.
U.S. Appl. No. 12/831,072—Notice of Allowance, Dec. 4, 2013, 12 pages.
U.S. Appl. No. 12/957,258—Final Office Action dated Jan. 4, 2012, 24 pages.
U.S. Appl. No. 12/957,258—Response filed Dec. 7, 2011, 12 pages.
U.S. Appl. No. 12/957,258—Office Action dated Jun. 7, 2011, 31 pages.
U.S. Appl. No. 12/957,245—Office Action dated Jun. 7, 2011, 31 pages.
U.S. Appl. No. 12/957,245—Response filed Dec. 7, 2011, 13 pages.
U.S. Appl. No. 12/957,245—Final Office Action dated Jan. 3, 2012, 22 pages.
U.S. Appl. No. 12/957,245—Response filed Jul. 2, 2012, 9 pages.
U.S. Appl. No. 12/957,245—Interview Summary and Authorization for Examiner's Amendment filed Jul. 31, 2012, 8 pages.
U.S. Appl. No. 12/957,245—Office Action dated Jul. 8, 2013, 21 pages.
U.S. Appl. No. 12/957,245—Response filed Oct. 28, 2013, 13 pages.
U.S. Appl. No. 12/957,245—Notice of Allowance dated Dec. 11, 2013, 12 pages.
U.S. Appl. No. 12/957,230—Final Office Action dated Jan. 3, 2012, 22 pages.
U.S. Appl. No. 12/957,230—Response filed Dec. 6, 2011, 12 pages.
U.S. Appl. No. 12/957,230—Office Action dated Jun. 6, 2011, 32 pages.
U.S. Appl. No. 12/957,217—Final Office Action dated Dec. 23, 2011, 17 pages.

(56) References Cited

OTHER PUBLICATIONS

U.S. Appl. No. 12/957,217—Response filed Nov. 28, 2011, 12 pages.
U.S. Appl. No. 12/957,217—Office Action dated May 27, 2011, 30 pages.
WO 2006/096792—International Search Report, dated Oct. 19, 2007, 2 pages.
Greenspun, Philip, "Building Relational Database-Backed Web Sites", greenspun.com, http://philip.greenspun.com/wtr/rdbms-backed.html, accessed Aug. 29, 2011, 6 pages.
Swan, Mindjet Releases MindManager for salesforce.com, Jun. 21, 2004, Retrieved from internet: <http://www.mindjet.com/press/releases/422>.
Martin, James, Principles of Object Oriented Design and Analysis, Copyright 1993, pp. 18-19, 3 pages.
"SUBST—Substitute a drive letter for a network or local path", date unknown (but ranges from 1999 through 2013), ss64.com, http://ss64.com/nt/subst.html.
Silberschatz, Abraham, and Galvin, Peter Baer, "Operating System Concepts", 1999, John Wiley & Sons, 5th ed, pp. 536-537.
HP-UX Reference Release 11.0 User Commands 1997, Hewlett Packard, vol. 1 1st ed., pp. 80, 81, 83, 34.
U.S. Appl. No. 13/862,084—Non-final office action dated Mar. 2, 2015, 32 pages.
HP, "Installing and Administering NFS Services", HP 9000 Networking, Edition 6, B1031-90044 E0898, 1998, 1 page.
JP 2008-500894—Response and Written Amendment with partial English translation filed Nov. 15, 2011, 13 pages.
JP 2008-500894—Notice of Reasons for Rejection (and English translation) dispatch date of Aug. 15, 2011, 5 pages.
PCT/US2006/08326—Written Opinion of the International Searching Authority, dated Oct. 19, 2007, 3 pages.
PCT/US2006/08326—International Preliminary Report on Patentability, dated Oct. 10, 2008, 6 pages.
IN 7111/DELNP/2007—First Examination Report dated Oct. 8, 2013 (Aug. 10, 2013), 2 pages.
IN 7111/DELNP/2007—Response of First Examination Report, dated Jun. 11, 2014, 35 pages.
IN 7111/DELNP/2007—Hearing Notice dated Jan. 22, 2015, 2 pages.
IN 7111/DELNP/2007—Response to Hearing Notice date Jan. 31, 2015, response dated Mar. 3, 2015, 23 pages.
CN 200680007168.9—First Office Action (with English translation) dated Aug. 30, 2010, 15 pages.
CN 2006800071689—Second Office Action (with English translation) dated Dec. 31, 2011, 21 pages.
CN 200680007168.9—Third Office Action (with English translation) dated May 3, 2012, 18 pages.
CN 200680007168.9—Fourth Office Action (and English translation) dated Oct. 9, 2012, 10 pages.
CN 200680007168.9—Response to Second Office, filed Mar. 14, 2012, 14 pages.
CN 200680007168.9—Response to Third Office Action filed Jul. 17, 2012, 12 pages.
CN 200680007168.9—Response to Fourth Office Action filed Dec. 13, 2012, 14 pages.
CN 200680007168.9—Notice on Grant of Patent Right for Invention (with English translation), dated Feb. 1, 2013, 4 pages.
EP 06737493.4—Supplemental Search Report dated Nov. 10, 2009, 3 pages.
EP 06737493.4—Response to Search Opinion, response dated Sep. 20, 2010, 17 pages.
U.S. Appl. No. 11/075,546—Notice of Allowance dated Apr. 6, 2010, 11 pages.
U.S. Appl. No. 11/075,546—Response dated Jan. 7, 2010, 30 pages.
U.S. Appl. No. 11/075,546—Response dated Jan. 8, 2008, 16 pages.
U.S. Appl. No. 11/075,546—Response dated Apr. 29, 2009, 26 pages.
U.S. Appl. No. 11/075,546—Office Action dated Jul. 7, 2009, 24 pages.
U.S. Appl. No. 11/075,546—Office Action dated Oct. 29, 2008, 12 pages.
U.S. Appl. No. 11/075,546—Office Action dated Apr. 14, 2008, 28 pages.
U.S. Appl. No. 11/075,546—Office Action dated Jul. 18, 2007, 19 pages.
U.S. Appl. No. 12/957,200—Notice of Allowance dated Jul. 8, 2013, 12 pages.
U.S. Appl. No. 12/957,200—Response dated Jul. 2, 2012, 9 pages.
U.S. Appl. No. 12/957,200—Response dated Dec. 7, 2011, 32 pages.
U.S. Appl. No. 12/957,200—Office Action dated Dec. 30, 2011, 19 pages.
U.S. Appl. No. 12/957,200—Office Action dated Jun. 8, 2011, 32 pages.
U.S. Appl. No. 12/831,072—Office Action dated Sep. 20, 2010, 17 pages.
U.S. Appl. No. 12/831,072—Response filed Mar. 16, 2011, 13 pages.
U.S. Appl. No. 12/831,072—Final Office Action dated Mar. 31, 2011, 12 pages.
U.S. Appl. No. 12/831,072—Response filed Jun. 27, 2011, 10 pages.
U.S. Appl. No. 12/831,072—Office Action dated Aug. 2, 2011, 13 pages.
U.S. Appl. No. 12/831,072—Response dated Jan. 3, 2012, 10 pages.
U.S. Appl. No. 12/831,072—Final Office Action dated Jan. 19, 2012, 16 pages.
U.S. Appl. No. 12/831,072—Response filed Jul. 19, 2012, 10 pages.
U.S. Appl. No. 13/862,084—Office Action dated Apr. 11, 2016, 20 pages.
U.S. Appl. No. 13/862,072—Response to Office Action dated Apr. 11, 2016 filed Aug. 11, 2016, 18 pages.
U.S. Appl. No. 13/862,084—Response to Office Action dated Apr. 11, 2016 filed Aug. 11, 2016, 17 pages.
EP 06737493.4—First Examination Report dated Sep. 16, 2016, 6 pages.
JP 2008-500894—Notice of Allowance dated Jul. 2, 2012, 3 pages.
CN 200680007168.9—Response to First Office Action dated Aug. 30, 2010 filed Jan. 13, 2011, 12 pages.
U.S. Appl. No. 13/862,084—Final Office Action dated Nov. 23, 2016, 20 pages.

\* cited by examiner

Tab Set Settings:

| | Visible | Default | | Visible | Default |
|---|---|---|---|---|---|
| Salesforce.com | ✓ | | Supportforce.com | ✓ | |
| Monkeyface | ✓ | ✓ | Bugforce | ✓ | |
| Foundation | ✓ | | | | |

Tab Settings:

| | Visible | | Visible |
|---|---|---|---|
| Home: | Default On | Campaigns: | Default On |
| Leads: | Default On | Accounts: | Default On |
| Contacts: | Default On | Opportunities: | Default On |
| Forecasts: | Default On | Contracts: | Default On |
| Cases: | Default On | Solutions: | Default On |
| Products: | Default On | Reports: | Default On |
| Documents: | Default On | Dashboards: | Default On |
| Orders: | Default Off | Monkeys: | Tab Hidden |
| Zoos: | Tab Hidden | Bugs: | Default Off |
| Releases: | Default Off | Volunteer Activities: | Default Off |

Record Type Settings:

| | |
|---|---|
| Accounts | Contacts |
| Leads | Opportunities |
| Cases | Campaigns |
| Tasks | Events |
| Contracts | Solutions |
| Products | |

Administrative Permissions:

Personal Setup
⊞ My Personal Information
⊞ Email
⊞ Mobile Users
⊞ Import
⊞ Office Edition

Customforce
⊞ Customize
⊞ Extend
⊞ Integrate

Administration Setup
⊞ Manage Users
  Users
  Mass Email Users
  Roles
  Profiles
  Public Groups
  Login History
  Training History
⊞ Company Profile
⊞ Security Controls
⊞ Communication Templates
⊞ Translation Workbench
⊞ Data Management

Order Center
  Subscription Summary

Profile Edit: Admin Clone

Set the permissions and page layouts for this profile.

[Save] [Cancel]

Profile Name: [Admin Clone]

■ = Required Information

Tab Set Settings:

| | Visible | Default | | Visible | Default |
|---|---|---|---|---|---|
| Salesforce.com: | ☑ | ⦿ | Supportforce.com | ☑ | ○ |
| Monkeyforce: | ☑ | ○ | Bugforce: | ☑ | ○ |
| Foundation: | ☑ | ○ | | | |

Tab Settings:

| | | | |
|---|---|---|---|
| Home | Default On | Campaigns | Default On ▸ |
| Leads | Default On ▸ | Accounts | Default On ▸ |
| Contacts | Default On ▸ | Opportunities | Default On ▸ |
| Forecasts | Default On ▸ | Contracts | Default On ▸ |
| Cases | Default On ▸ | Solutions | Default On ▸ |
| Products | Default On ▸ | Reports | Default On ▸ |
| Documents | Default On ▸ | Dashboards | Default On ▸ |
| Orders | Default Off ▸ | Monkeys | Tab Hidden ▸ |
| Zoos | Tab Hidden ▸ | Bugs | Default Off ▸ |

? Help

SYSTEMS AND METHODS FOR IMPLEMENTING MULTI-APPLICATION TABS AND TAB SETS

CROSS-REFERENCES TO RELATED APPLICATIONS

This application is a continuation of U.S. patent application Ser. No. 12/831,072, titled "Systems and Methods for Implementing Multi-Application Tabs and Tab Sets" filed Jul. 6, 2010, now U.S. 8,701,024, issued Apr. 15, 2014, which is a continuation of U.S. Pat. No. 11/075,546, titled "Systems and Methods for Implementing Multi-Application Tabs and Tab Sets" filed Mar. 8, 2005, now U.S. Pat. No. 7,774,366, issued Aug. 10, 2010, the contents of which are hereby incorporated by reference in their entirety.

BACKGROUND OF THE INVENTION

The present invention relates generally to databases, and more particularly to systems and methods for creating and displaying custom tab and tab set objects for use in a multi-tenant and/or multi-application database system.

In multi-tenant database systems, such as the salesforce.com service, a multi-tenant architecture is used wherein customer organizations (i.e., tenants) share applications and data, and database resources in one logical database. The database tables themselves are typically shared. For example, each entity in the data model typically contains an organization_id column that distinguishes rows for each tenant. All queries and data manipulation in the context of a tenant filter on this (indexed) organization_id column to ensure proper security and the appearance of virtual private databases. In the salesforce.com system, for example, this strategy is used to expose standard entities such as Account, Contact, Lead, and Opportunity entities to customers.

However, customers may wish to add their own custom objects and applications to the system in addition to the standard objects and standard applications already provided. In a traditional client/server application, where the customer has its own physical database, adding custom objects is typically done via DDL (data definition language) against that database to create new physical schema—tables and columns. In an online multi-tenant database system, such as the salesforce.com service, this approach may be untenable for various reasons. For example, for a database system with a large population of tenants (e.g., on the order of 1,000 or 10,000 or more tenants), the union of all desired schema would overwhelm the underlying data dictionary catalog (e.g., Oracle dictionary). Additionally, the maintenance of all of these schema objects would be a nearly impossible burden for DBAs (database administrators). Further, current relational databases do not support online DDL (in a highly concurrent transactional system) well enough for organizations to remain logically independent. Specifically, the creation of schema by one organization could lock an application for all other customers causing unacceptable delays.

U.S. Pat. No. 7,779,039, entitled "Custom Entities and Fields in a Multi-Tenant Database System" issued on Aug. 17, 2010, which is herein incorporated by reference in its entirety, discloses systems and methods for creating and customizing objects such as entities and fields. The systems and methods presented therein offer a flexible approach to storing variable schema data in a fixed physical schema so as to overcome the above and other problems.

However, in addition to providing the ability to create custom database objects such as entities and fields, it would be desirable to provide a sharing model that allows users to easily and conveniently share such standard and custom objects and applications among users or groups of users. The sharing model should allow users to create custom views that provide user access to various objects and application elements. Such sharing model should also provide individual users the ability to customize individual views of the model so as to provide a more convenient, user-friendly database and application user interface environment to the user.

BRIEF SUMMARY OF THE INVENTION

The present invention provides a novel sharing model that enables users to easily and conveniently create and share standard and custom database objects, and applications, among users or groups of users.

According to the present invention, the sharing model provides systems and methods that allow users to create and customize tabs and tab sets that define relationships between custom objects and fields, standard objects and fields, and applications. A tab visually represents a user interface into an element of an application or into a database object. Selection of a tab provides a user access to the object or element of the application represented by the tab. A tab set is a group of related tabs that work as a unit to provide application functionality. New tabs and tab sets may be defined and tab set views may be customized so that an end user can easily and conveniently switch between the various objects and application elements represented by the displayed tabs and tab set views. In this manner, tabs and tab sets may be used as a means for a user to switch between objects and between applications in a multiple application environment, such as an on-demand web-based hosted application environment. Further, using profiles, a creator of a tab set or other user with appropriate permission may define which users may see and use a tab set definition, and therefore which users are allowed access to the custom objects and applications to which tabs in the tab set definition provide access.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 18 shows an example of a Profile Detail Page showing details of the selections as were made in the Profile Edit Page shown in FIG. 19.

FIG. 19 shows an example of a Profile Edit page according to one aspect.

DETAILED DESCRIPTION OF THE INVENTION

Figure 1:
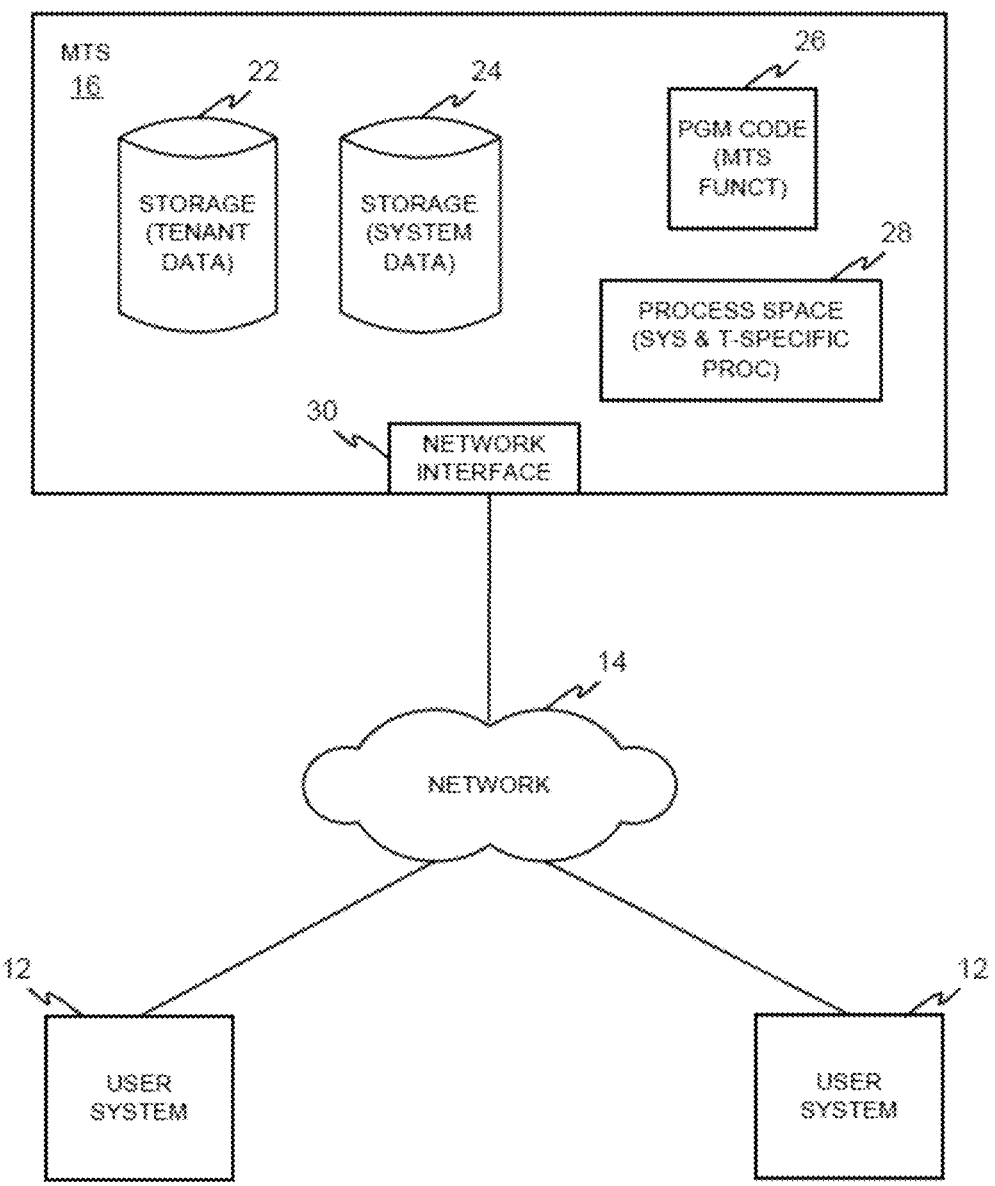
FIG. 1 illustrates an environment wherein a multi-tenant database system might be used.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by permissions for the current user. For example, where a salesperson is using a particular user system 12 to interact with MTS 16, that user system has the capacities allotted to that salesperson. However, while an administrator is using that user system to interact with MTS 16, that user system has the capacities allotted to that administrator. Thus, different users will have different capabilities with regard to accessing and modifying application and database information, including tab and tab set definition and profile information, depending on a user's permission level.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared. It should, however, be appreciated that system 16 can also implement applications other than, or in addition to, a CRM application. For example, system 16 may provide tenant access to multiple hosted applications including a CRM application.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application hosting service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information, pages and applications available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by MTS 16 or other systems or servers. For example, the user interface device can be used to select tabs and tab sets and otherwise allow a user to interact with the various GUI pages as described herein.

As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, any other markup language, Java, JavaScript, any other scripting language such as VBScript, and many other programming languages as are well known.

According to one embodiment, each MTS 16 is configured to provide web pages, forms, applications, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
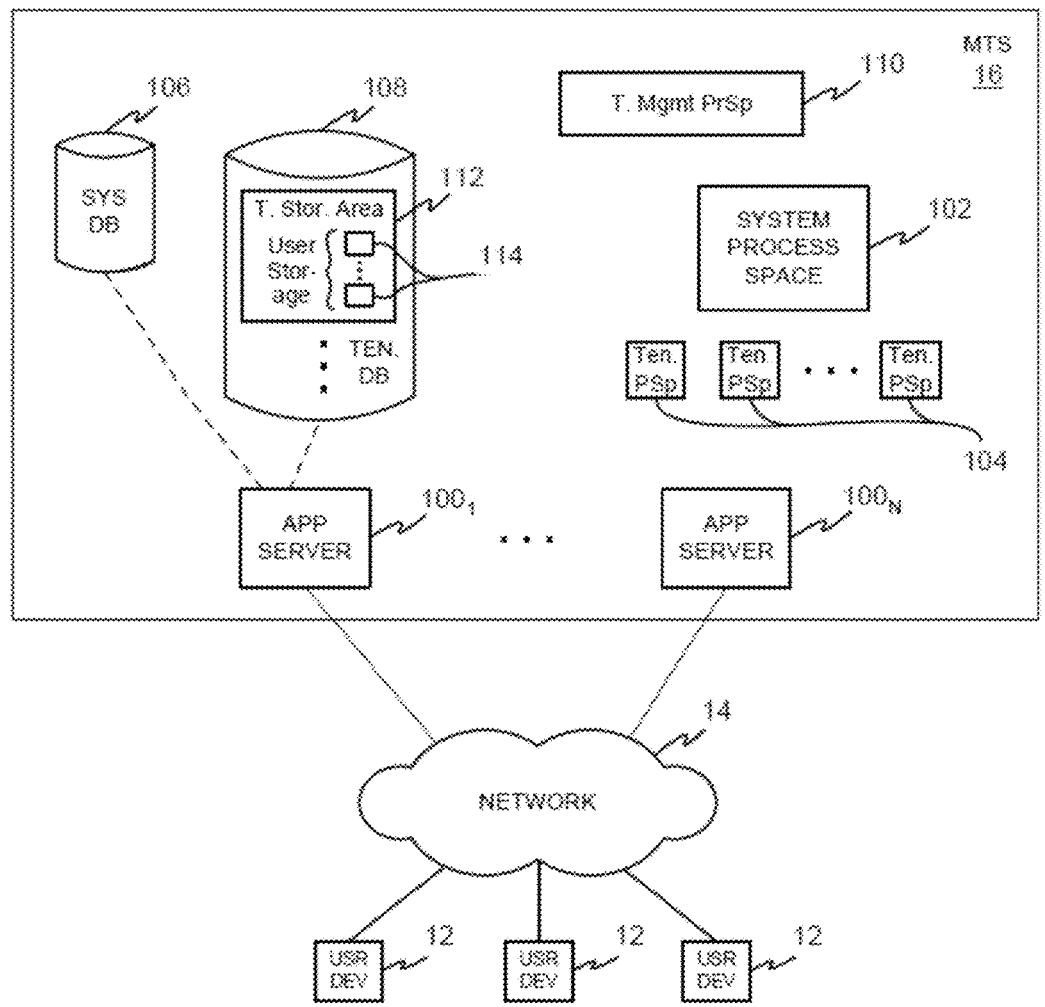
FIG. 2 illustrates elements of FIG. 1 and various interconnections in more detail.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of, and access to, different objects, data and applications across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

According to one aspect, a user can design their own custom applications including custom objects, custom tabs, custom fields, and custom page layouts. U.S. patent application Ser. No. 10/817,161, entitled "Custom Entities and Fields in a Multi-Tenant Database System" filed on Apr. 2, 2004, previously incorporated by reference in its entirety, discloses systems and methods for creating and customizing objects such as entities and fields. Using the techniques of the present invention, tabs and tab sets can be created and customized to define relationships between custom objects and fields, standard objects and fields, and applications and to track related data.

Custom Tabs and Tab Sets

According to the present invention, in general, a tab represents a user interface into an element of an application or into a database object. Selection of a tab provides a user access to the object or element of the application represented by the tab. A tab set is a group of related tabs that work as a unit to provide application functionality. The present invention allows for new tabs and tab sets to be defined and tab set views to be customized so that an end user can easily and conveniently switch between the various objects and application elements represented by the displayed tabs and tab sets. In one aspect, for example, tabs and tab sets may be used as a means to switch between applications in a multiple application environment, such as an on-demand web-based hosted application environment.

In one embodiment, a tab set includes a name, a logo, and an ordered list of tabs. A tab set is typically viewed in a graphical user interface (GUI) environment, e.g., using a browser application running on a user's computer system.

Figure 3:
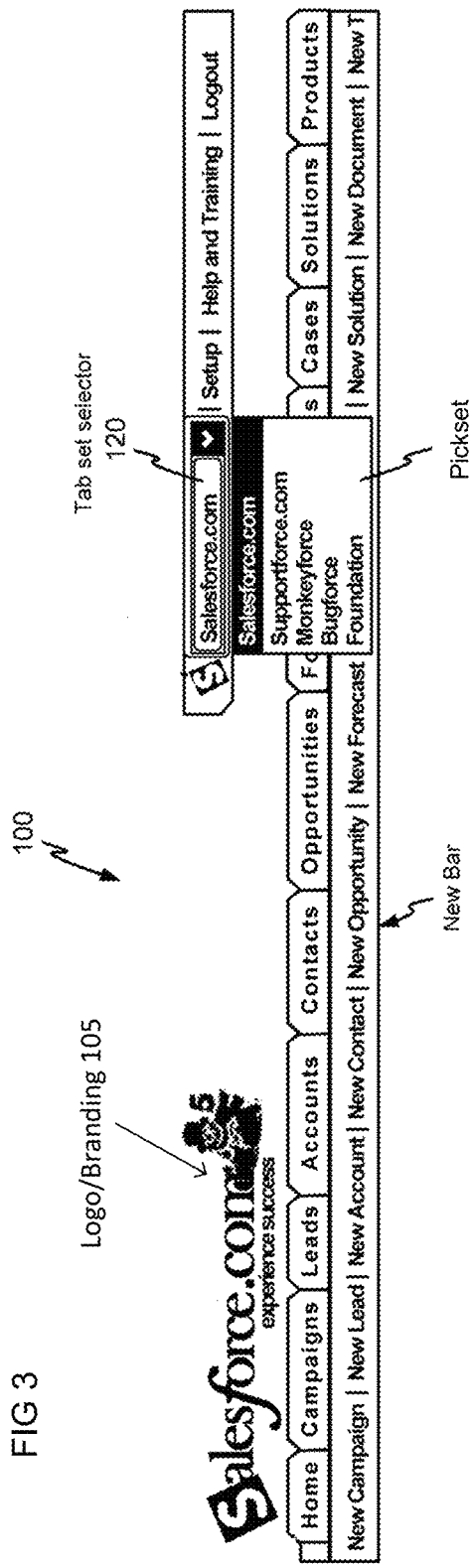
FIG. 3 is a user interface (UI) view of a standard tab set definition provided by a host system according to one embodiment.

For example, FIG. 3 illustrates an example of a portion of a GUI view of a tab set. As shown in FIG. 3, the currently selected tab set 100 includes branding and/or a logo 105 and a tab set selector 120, which preferably is only included when multiple tab sets are available for selection by a user. The tab set selector 120 in certain aspects includes a dropdown list, or picklist, that is available when multiple tab sets are provided and that is used to switch between the available sets of tabs. When a user changes the selection, the displayed tabs, order of tabs and "new xxx" bar are changed based on the selected tab set definition.

The tab set shown in FIG. 3 represents a standard tab set definition provided by a host system, e.g., MTS 16. Standard tab sets are pre-defined sets of tabs, e.g., imported from a source that provides a capability (e.g., templating capability) that determines which tabs, tab sets and data a tenant or user is initially provisioned with. One example of standard tab sets are provided by the salesforce.com website through its subscription CRM service. Using these standard tab sets, users are provided access to standard tables or entities such as Account, Contact, Lead and Opportunity entities. For example, tabs representing the salesforce.com Account, Contact, Lead and Opportunity entities and others are shown in FIG. 3. As another example, salesforce.com also provides the ability to create custom entities as well as custom fields for standard entities. Using the present invention, a user can create a tab set including tabs representing custom entities and fields.

According to one aspect, a user may create custom tab sets and custom tabs. Preferably only administrator level users are provided with tab set creation functionality based on their stored permissions. Additionally, users may customize their view of tab sets, including the order of displayed tabs and which tabs in a tab set are displayed. To allow users to conveniently organize their tabs, each tab may appear in any and all tab sets if desired. Preferably, any user can edit tab combination and order, but cannot rename or replace a logo; tab set naming and logo selection are preferably only administrator level functions. For example, administrators may create new tab sets and customize existing tab sets. For all tab sets, an administrator can specify which tabs are included, and the order that the tabs should be displayed. For organization-specific tab sets, an administrator can also specify the name and provide an optional logo. For standard tab sets provided by the host system, e.g., tab sets provided by salesforce.com, such as Salesforce.com and Supportforce.com tab sets, an administrator preferably cannot change the name or logo, nor can the administrator delete the standard tab set. Preferably, any user can fully customize their view of all the tab sets they have permission to view. For users who only have access to a single tab set, in one aspect these users will not see the tab set selector 120. As will be discussed below, the tabs a user can see are based on the user's permission level. A profile for each tab set allows an administrator level user to set the profile level viewability of tabs and tab sets, e.g., so that groups of users at certain permission levels may be restricted from viewing certain tabs or tab sets, and therefore also may be restricted from accessing or viewing certain objects and applications referenced by the restricted tabs or tab sets.

Thus, in one aspect, a tab set can be thought of as a filter that is overlaid on top of an existing profile-level tab visibility definition. An administrator sets the default tabs that are included in each tab set filter, but each user can override as they like—the only thing they preferably cannot change is the tab set name and logo. The net result is that tab sets are quite lightweight and flexible. A particular meaning to a tab set is not enforced; each user can generally use tab sets as they wish.

Tab Set User Interface

Figure 4:
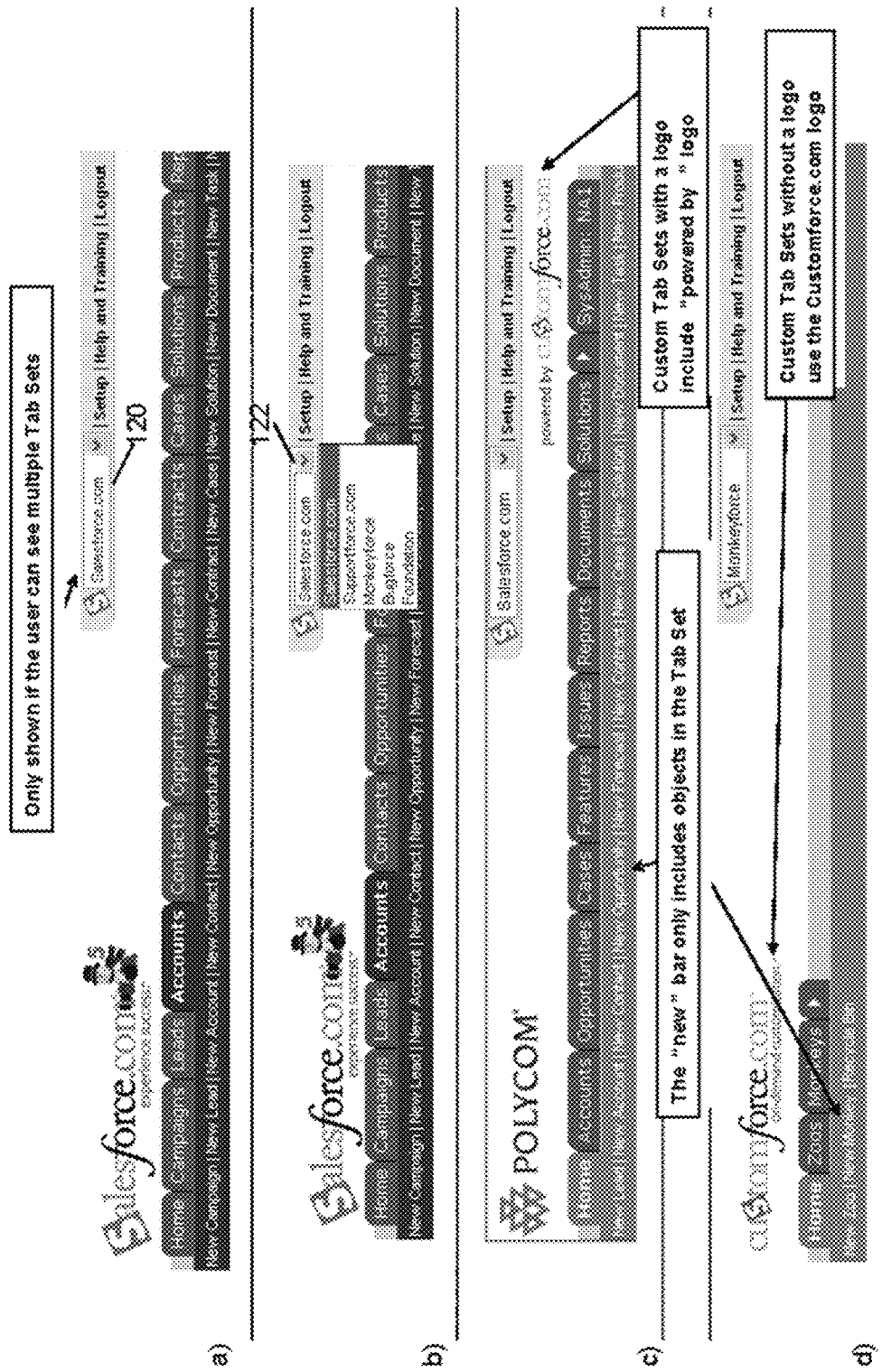
FIG. 4 illustrates various aspects of an example UI including tab sets according to one embodiment.

FIG. 4 illustrates various aspects of an example UI including tab sets according to one embodiment. As shown in FIG. 4, a portion of the screen (e.g., the upper-right-hand corner of each screen where Setup, Help and Training, Logout and other links are typically provided) may be shaded or otherwise prominently displayed to indicate that this section applies (e.g., is persistent) across all applications. For those users that have permission to view more than one tab set, the tab set selector 120 is also shown in this portion. As shown, the selector 120 includes an "S" logo, which in this example is used to brand the salesforce.com on-demand operating system, and a picklist 122, listing each of the tab sets the user has permission to view. When the user selects a tab set from the picklist 122, as shown in FIG. 4b, the tab set's logo is prominently displayed, e.g., in the upper-left-hand corner of the page as shown. If the tab set is not supplied by the host system, e.g., in this example the host is salesforce.com, and the customer provides a logo (i.e., the tab set does not use a default host logo), then an additional host-supplied graphic, such as a "powered by Customforce-.com" graphic, may be displayed next to the logon on the right-hand-side of the banner, as shown in FIG. 4c.

The tabs (except the Home tab) are replaced with the selected tab set's tabs, in the order specified by the stored tab set definition. By default, the Home tab is displayed as the current tab. The "new" bar is also replaced with a list of links for creating objects related to those objects referenced by the tabs in the selected tab set. For example, as shown in FIG. 4d, if the tab set includes the following tabs: Zoos and Monkeys, then the "new" bar would have the following: New Zoo, New Monkey and Recycle Bin. The order of links in the "new" bar preferably matches the order of tabs in the tab set, but it is not necessary as can be seen in FIG. 4c.

In one aspect, to help users understand the tab set selector 120, when the mouse hovers over either the "S" logo or the picklist 122, a tool tip will be displayed explaining the concept of tab sets.

If the user creates a new object or views an existing object, and that object is not referenced in the selected tab set, then the behavior of the system is preferably unaltered, e.g., the same as that which occurs for viewing or creating new objects that do not have a tab. Even if that object has a tab in another of the user's tab sets, the selected tab set preferably does not change. Where a recent items list is used, the list is preferably not filtered by the selected tab set definition. If the user clicks an item that does not have a tab displayed in the current tab set, its detail page will be displayed but its tab will not be displayed.

Figure 5:
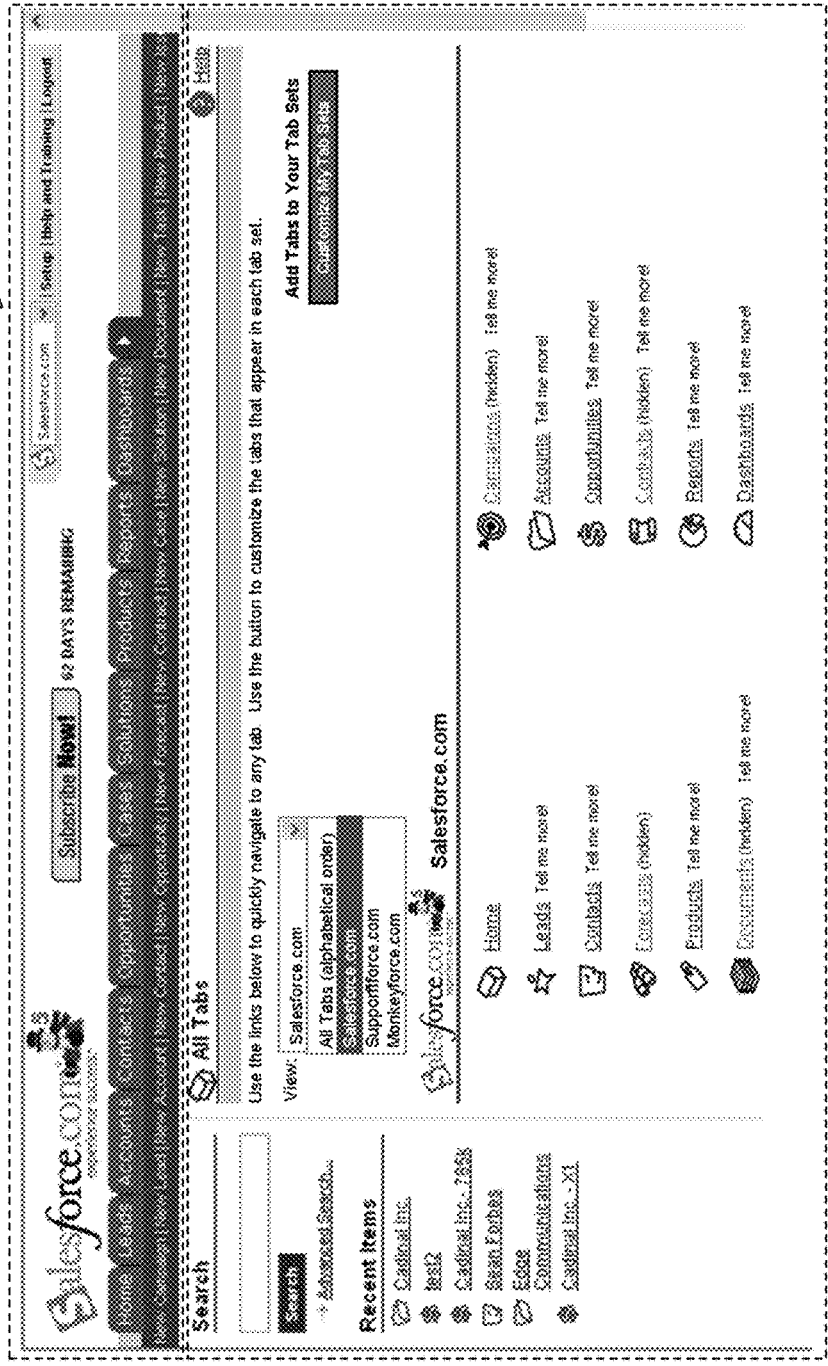
FIG. 5 shows an example of an "All Tabs" page that supports different modes of viewing tabs according to one aspect.

FIG. 5 shows an example of a page ("All Tabs" Page) that supports different modes of viewing tabs according to one aspect. The mode is selected using the "View" dropdown list (picklist) In one mode, all tabs the user has access to see are displayed in alphabetical order by selecting "All Tabs". In another mode, the tabs are grouped by tab set, in display order. As shown, the tabs for a standard salesforce.com tab set are shown in display order. The dropdown list allows the user to pick which tab set to display.

Figure 6:
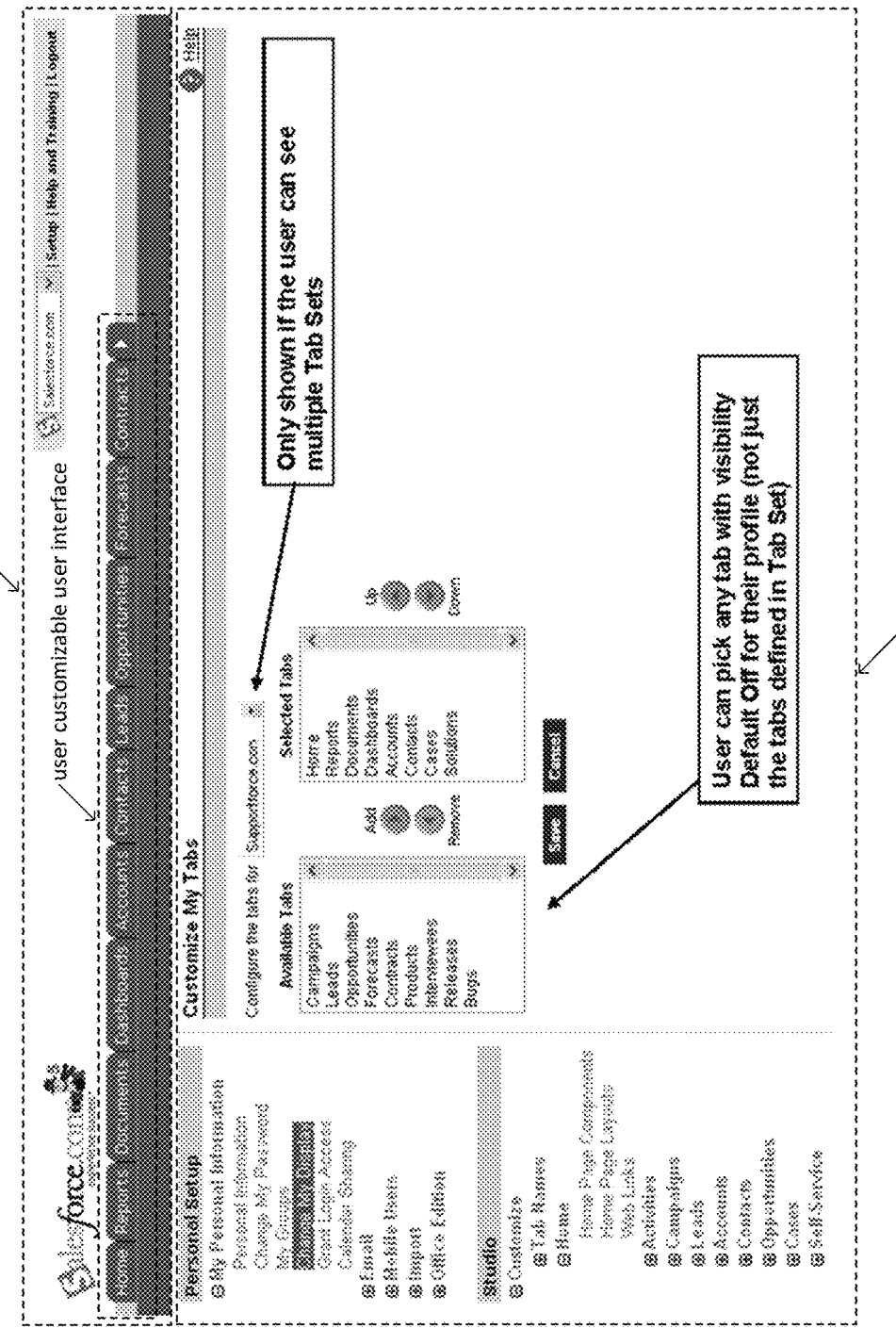
FIG. 6 shows an example of a page that provides users with the capability to fully customize each tab set, specifying which tabs go in which tab set, and the order of those tabs according to one aspect.

FIG. 6 shows an example of a page that provides users with the capability to fully customize each tab set, specifying which tabs go in which tab set, and the order of those tabs. The tabs listed in the dueling listboxes include all tabs that are not hidden for the user's profile. As shown in FIG. 6, the user may specify which tabs belong in a selected tab set using the "add" and "Remove" buttons. The user may also rearrange the order in which those tabs should appear using the "up" and "Down" buttons. Users are preferably only be able to view those tabs that they have permission to see, regardless of whether or not the tab is listed in a tab set.

Figure 7:
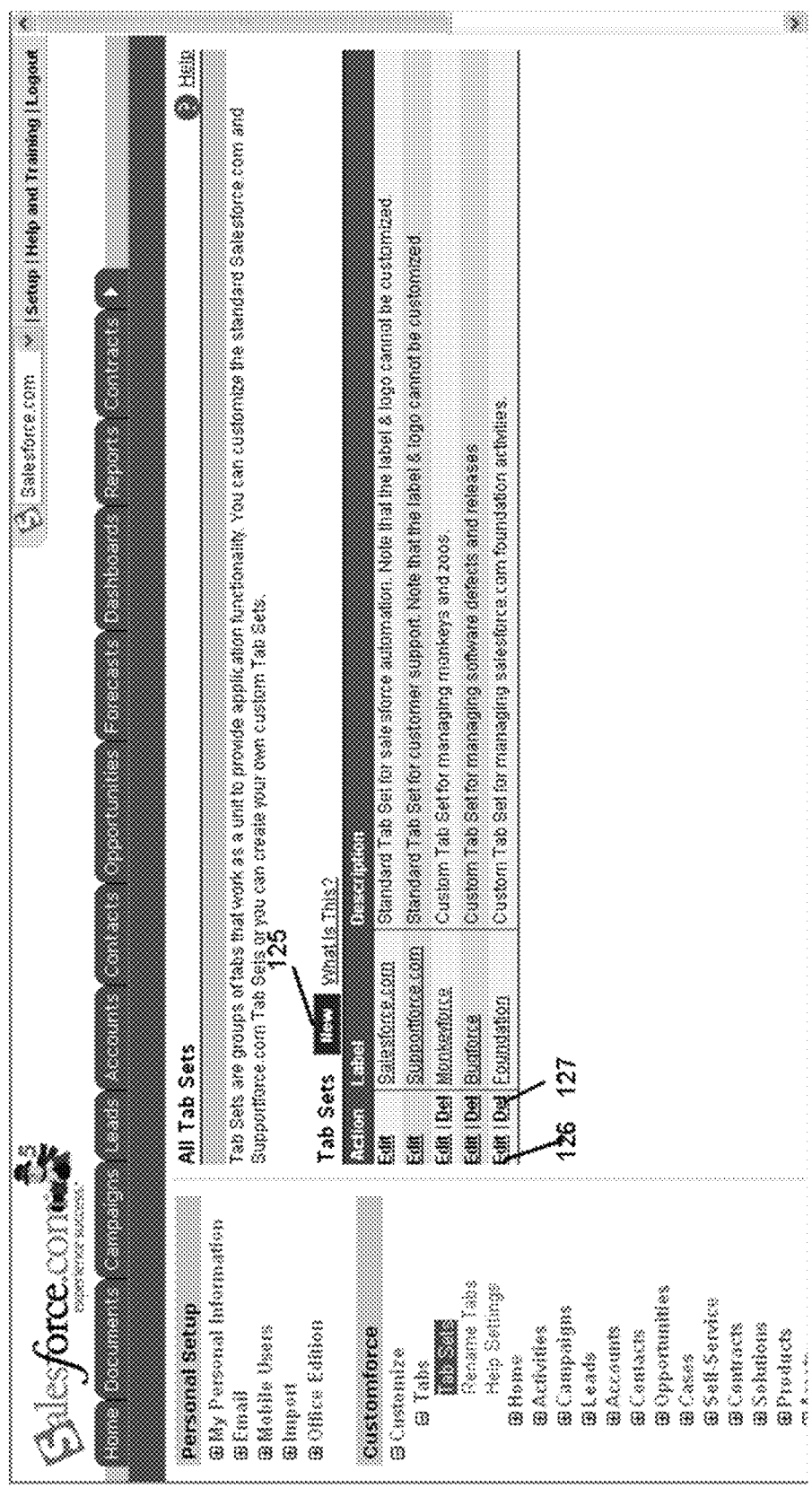
FIG. 7 shows an example of a tab set list view page that allows a user to create and customize tab sets according to one aspect.

FIG. 7 shows an example of a tab set list view page that allows a user to create and customize tab sets according to one aspect. Any user that has the appropriate permissions may administer tab sets, e.g., create, delete, edit, etc. The list view preferably includes a visual table containing an entry for each available tab set as shown. Each entry shows the tab set name and a description. As shown, the list view page supports a New action to create a new custom tab set by selecting a "New" button 125, an Edit action to edit a tab set by selecting an edit selector 126, and a Delete action to delete a tab set by selecting a delete selector 127.

Figure 8:
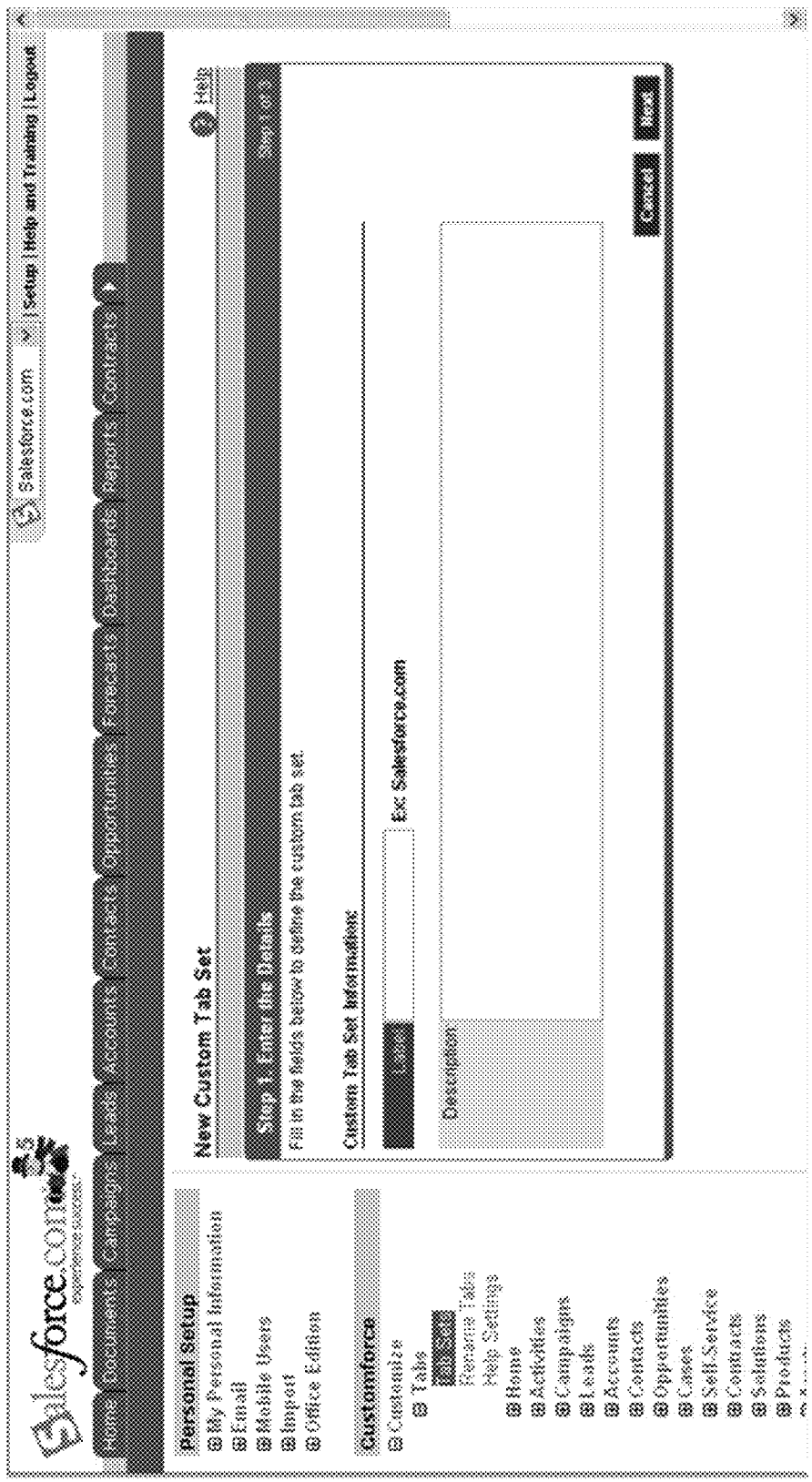
FIG. 8 shows an example of a first tab set creation wizard page according to one aspect.

Selection of the New button 125 invokes a tab set creation "wizard". FIG. 8 shows an example of a first wizard page according to one aspect. The wizard provides entry boxes for the user to enter the name (label) of the tab set as well as an optional description. The tab set name size is preferably limited, e.g., to a 40 character max length. Custom tab sets preferably cannot be named after standard tab sets provided by a host system. For example, in the case where salesforce.com provides the host system, "Salesforce", "Supportforce" and "Customforce" (with or without ".com") may not be used. The tab set name also preferably cannot contain HTML characters.

Figure 9:
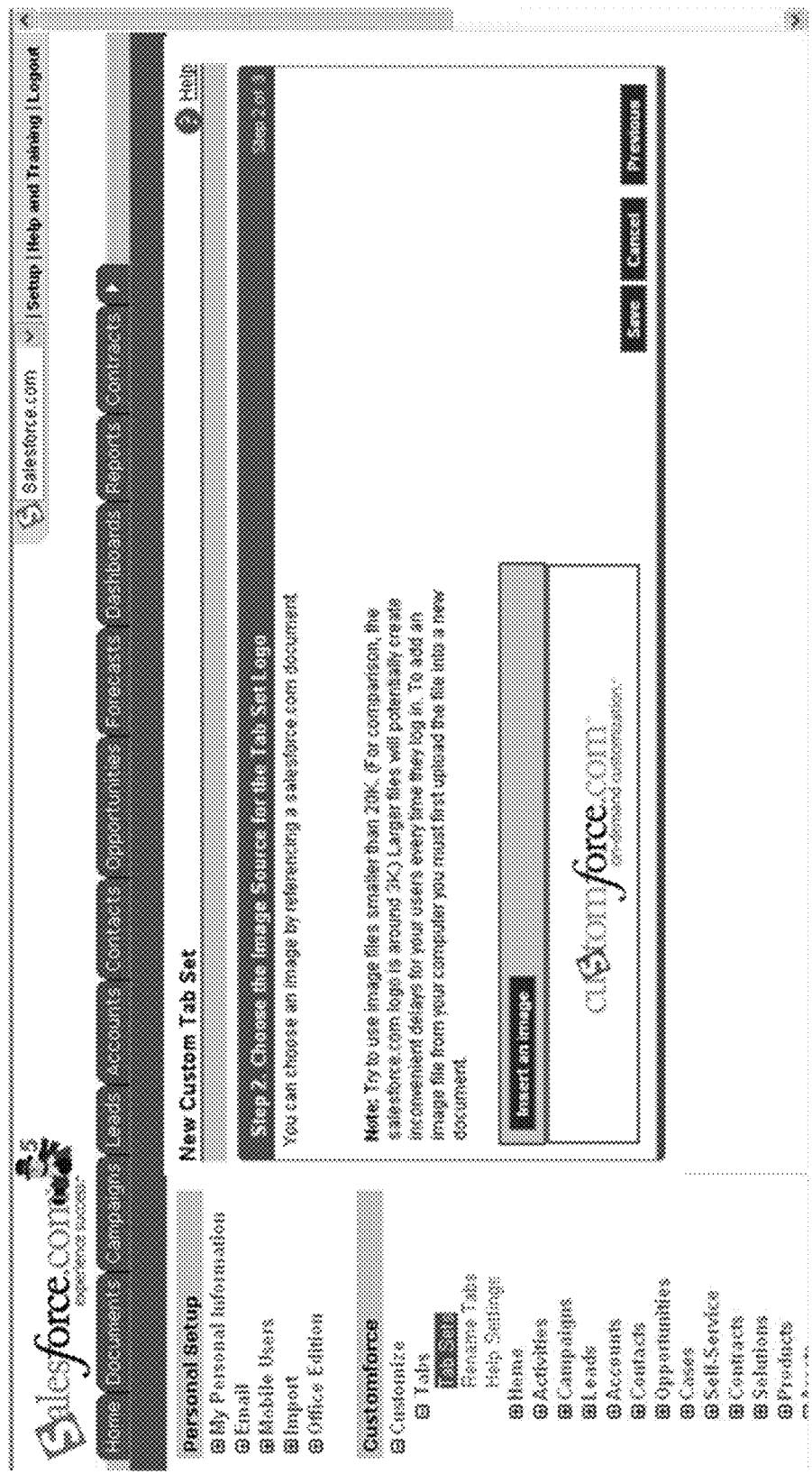
FIG. 9 shows an example of a second tab set creation wizard page that allows a user to provide a custom logo, according to one aspect.

FIG. 9 shows an example of a second wizard page that allows a user to provide a custom logo, according to one aspect. The second page is invoked when information in the first page has been entered and the user selects "next". As shown in FIG. 9, the user may supply a logo for the new tab set (by default, a host system logo such as the Customforce.com logo is pre-populated). After an image has been identified or uploaded to the system, the image may be scaled down or clipped if it is larger than a predetermined size (e.g., width: 235 pixels; height: 55 pixels). Scaling will maintain the original logo's aspect ratio. Although .gif images are preferred, other image formats such as JPEG, Bitmap and others may be used.

Figure 10:
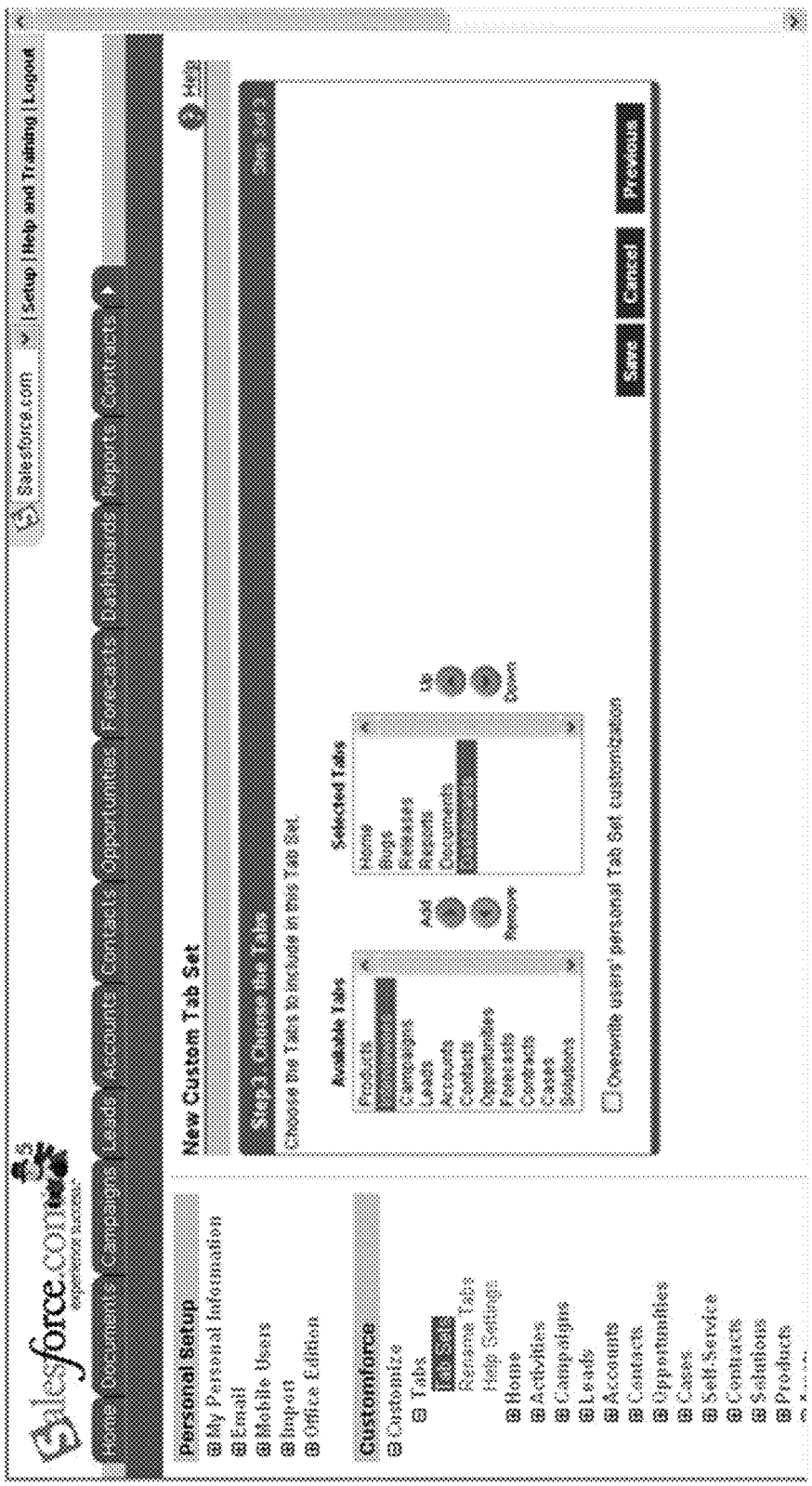
FIG. 10 shows an example of a third tab set creation wizard page that allows a user to specify which tabs belong in the new tab set, and the order they are to be displayed, according to one aspect.

FIG. 10 shows an example of a third wizard page that allows a user to specify which tabs belong in the new tab set, and the order they are to be displayed, according to one aspect. The third page is invoked when the user selects "save" in the second page. As shown in FIG. 10, the user may specify which tabs belong in this tab set using the "add" and "Remove" buttons. The user may also rearrange the order in which those tabs should appear using the "up" and "Down" buttons. Users are preferably only be able to view those tabs that they have permission to see, regardless of whether or not the tab is listed in a tab set.

Figure 11:
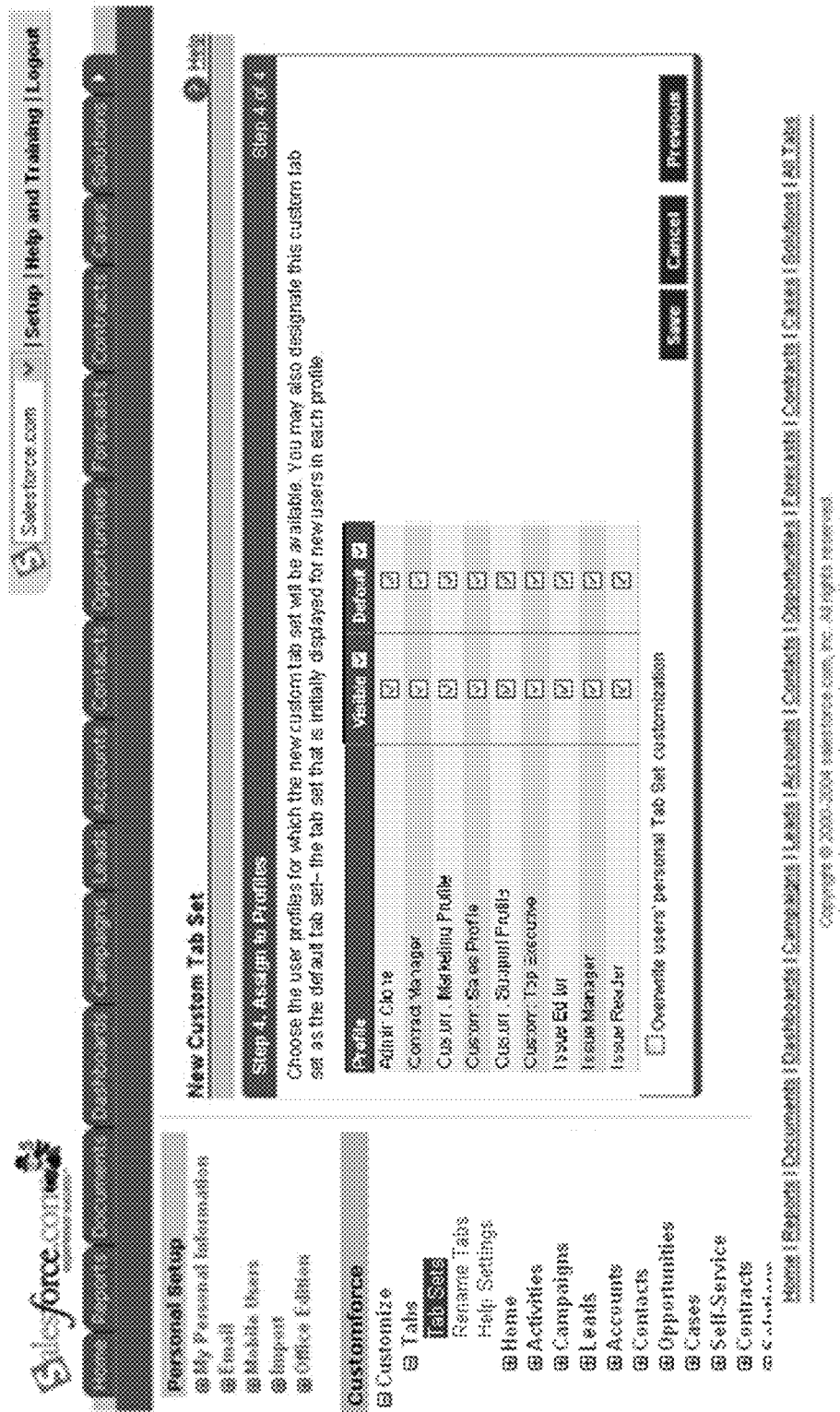
FIG. 11 shows an example of a fourth wizard page that allows a user to specify the tab set's visibility, according to one aspect.

FIG. 11 shows an example of a fourth wizard page that allows a user to specify the tab set's visibility, according to one aspect. The fourth page is invoked when the user selects "save" in the third page. As shown in FIG. 11, the user may choose the user profiles for which the new custom tab set will be available and to choose whether this custom tab set will be a default tab set. In one aspect, the user is able to specify the tab set's visibility and default behavior for each User Profile using a series of selectable checkboxes as shown.

Figure 12:
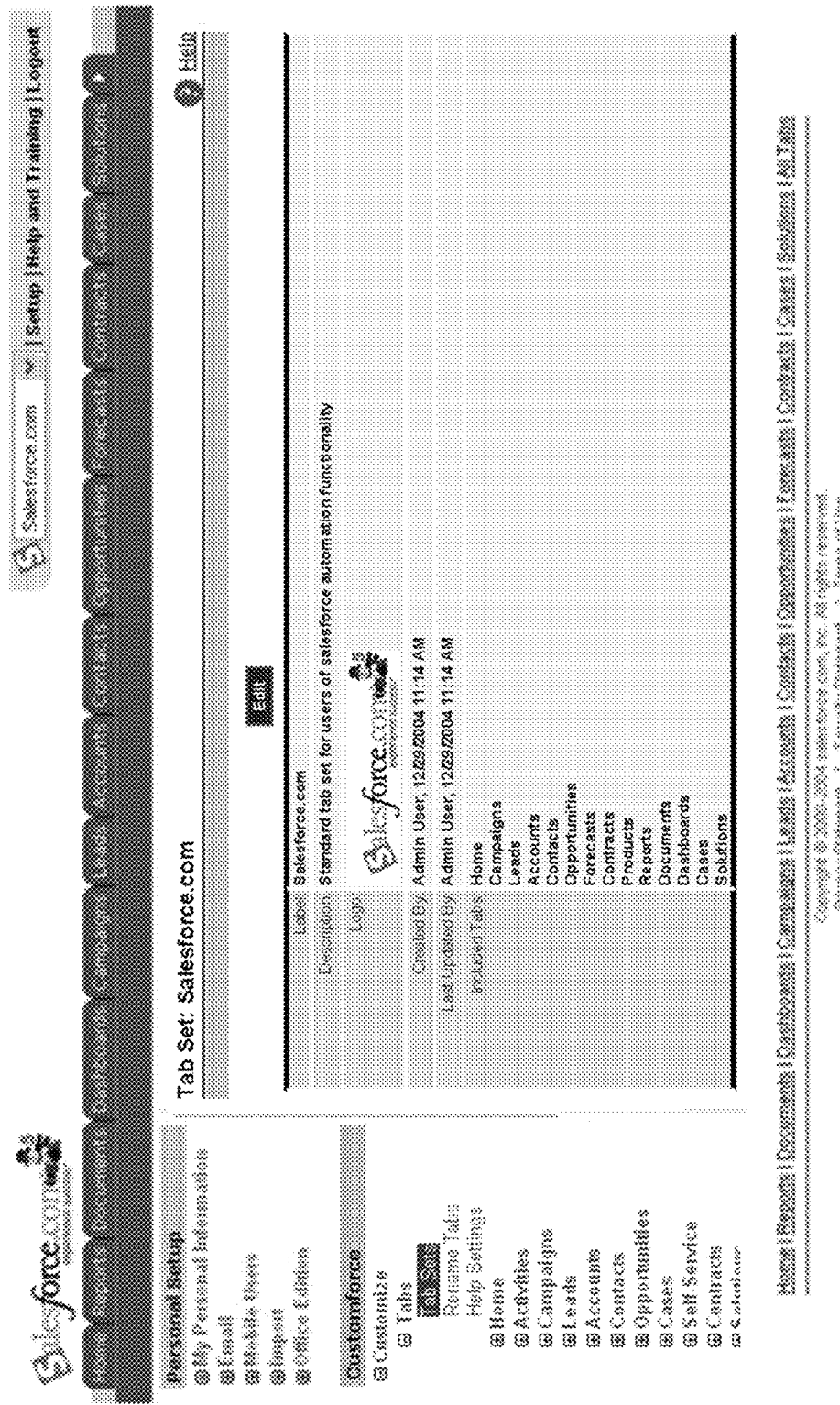
FIG. 12 shows an example of a tab set detail page that shows the details for an existing tab set according to one aspect.

FIG. 12 shows an example of a tab set detail page that shows the details for an existing tab set. Detail information may include the label, description, logo, included tabs, "created by" information and "last updated" information. This page may be invoked, for example, by selecting the tab set label from the All Tabs page shown in FIG. 7. As shown in FIG. 12, the user may also select the Edit action from this page.

Selection of the Edit action, e.g., in FIG. 7 or FIG. 12, invokes a wizard that is nearly identical to the wizard invoked by the New action as described above. However, detail entering and logo selection steps are not available for standard tab sets supplied by the host system, e.g., salesforce.com. Also, the last step of the wizard preferably includes a check box allowing the user to specify whether or not any changes should override any user's personal customizations.

Figure 13:
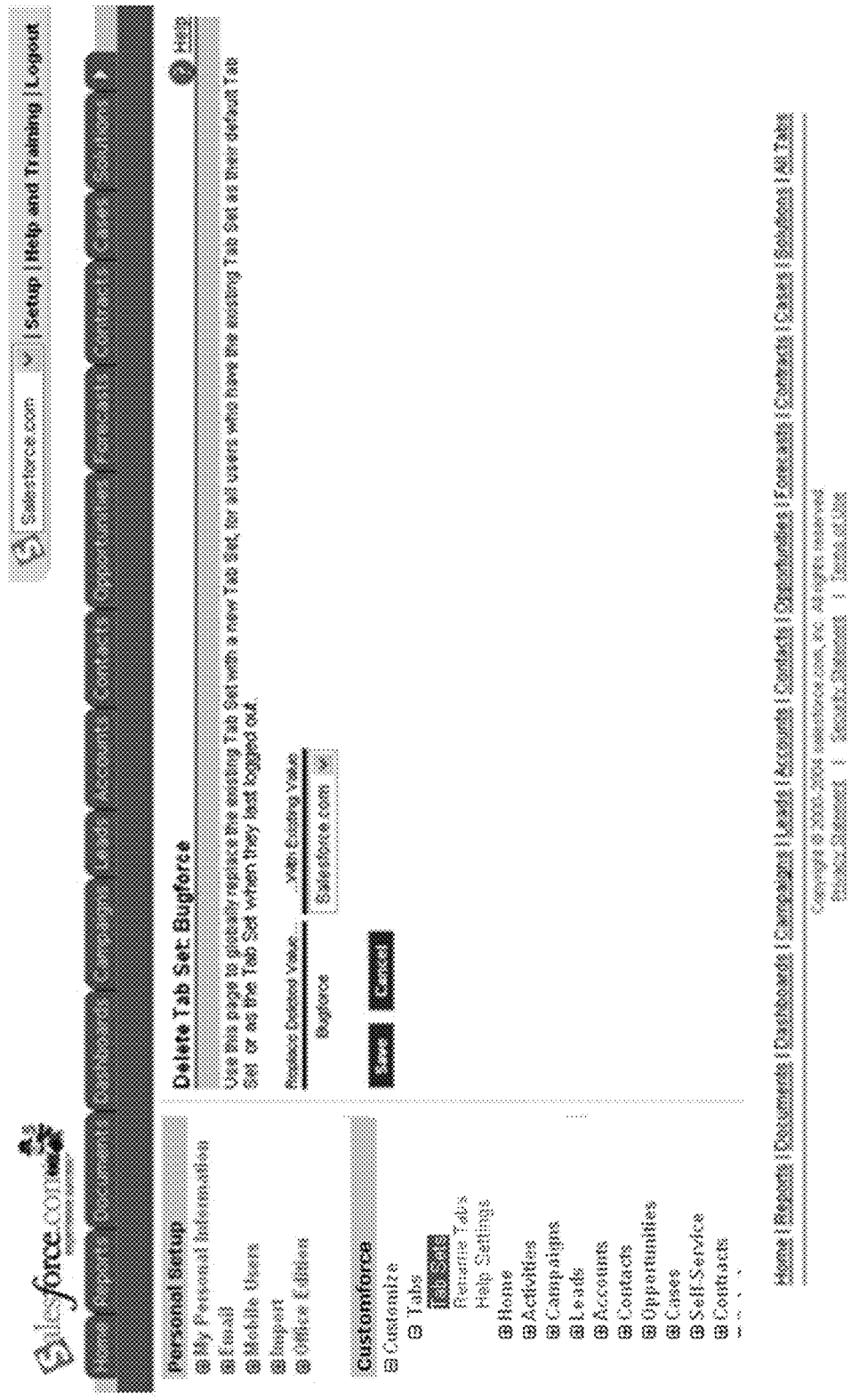
FIG. 13 shows an example of a page presented when a user selects the Delete action according to one aspect.

FIG. 13 shows an example of a page presented when a user selects the Delete action. When selected, the user is asked which other tab set should be set as the default tab set for those users that had the tab set that is about to be deleted selected as the default tab set. Because tab sets are effectively filters, they can be deleted without affecting the profile tab visibility preferences. The order of tabs preferably reverts to the current pre-tab set order scheme (i.e., standard tabs in hard-coded order, custom tabs in creation order).

Figure 14:
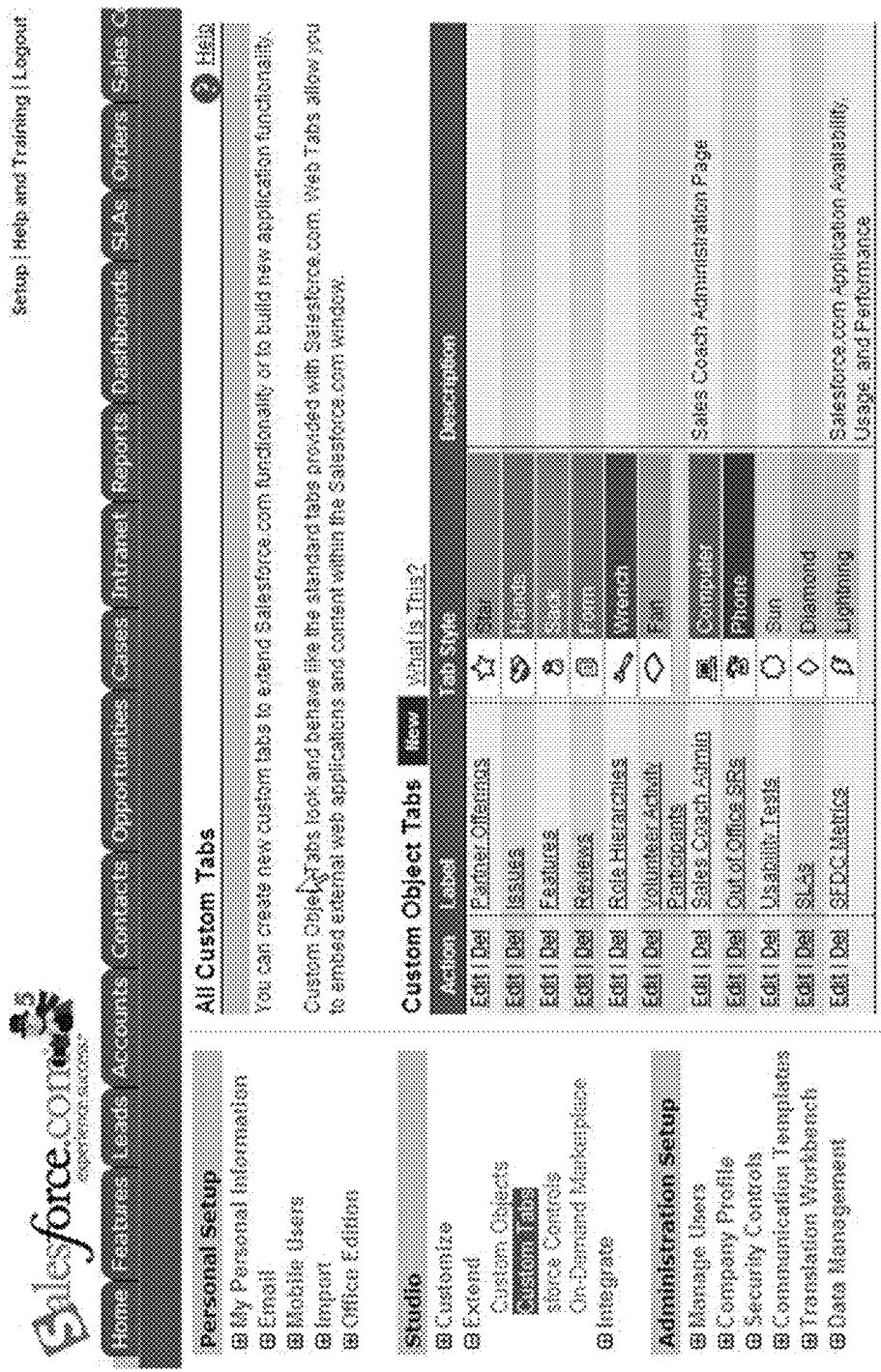
FIG. 14 shows an example of a tab list view page that allows a user to create and customize tabs according to one aspect.

According to one aspect, a user can also create custom tabs. FIG. 14 shows an example of a tab list view page that allows a user to create and customize tabs according to one aspect. The list view shown preferably includes a visual table containing an entry for each available tab as shown. Each entry shows the tab name, a tab style and a description. As shown, the list view page supports a New action to create a new custom tab by selecting a "New" button, an Edit action to edit an existing tab by selecting an edit selector, and a Delete action to delete an existing tab by selecting a delete selector. Again, preferably only administrator level users should have access to administer tabs. A user can create custom object tabs that reference custom objects, and web tabs that allow users to embed external web applications and content within a window.

Figure 15:
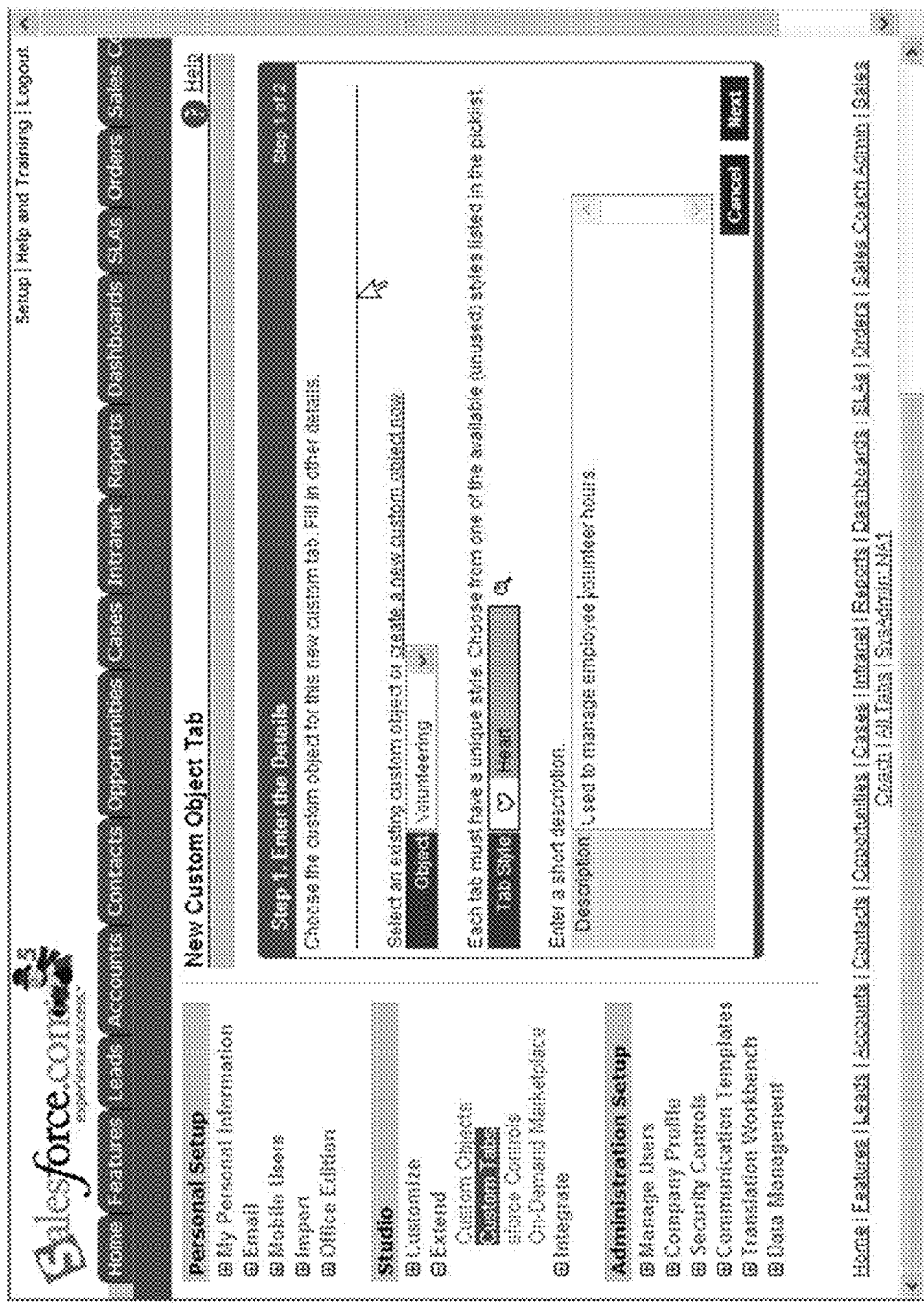
FIG. 15 shows an example of a first tab creation wizard page according to one aspect.

Selection of the New button invokes a tab creation "wizard". FIG. 15 shows an example of a first tab creation wizard page according to one aspect. This wizard provides entry boxes for the user to select the name of an existing custom object (or select to create a new custom object) as well as a tab style and an optional tab description.

Figure 16:
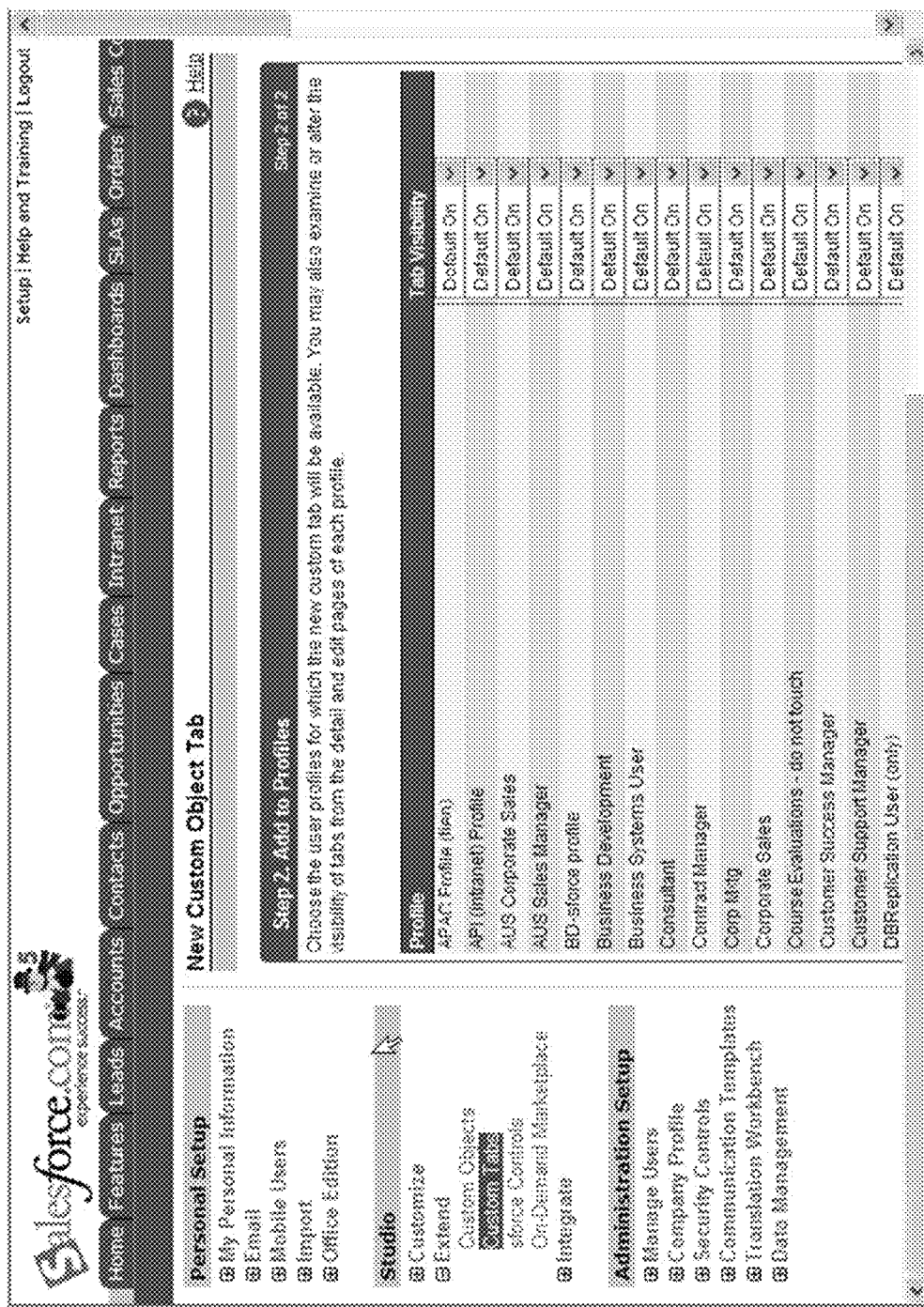
FIG. 16 shows an example of a second tab creation wizard page according to one aspect.

FIG. 16 shows an example of a second tab creation wizard page according to one aspect. The second page is invoked when information in the first page has been selected or entered and the user selects "next". The user may choose the user profiles for which the new custom tab will be available. In one aspect, the user is able to specify the tab's visibility and default behavior for each User Profile using a series of selectable checkboxes as shown.

Figure 17:
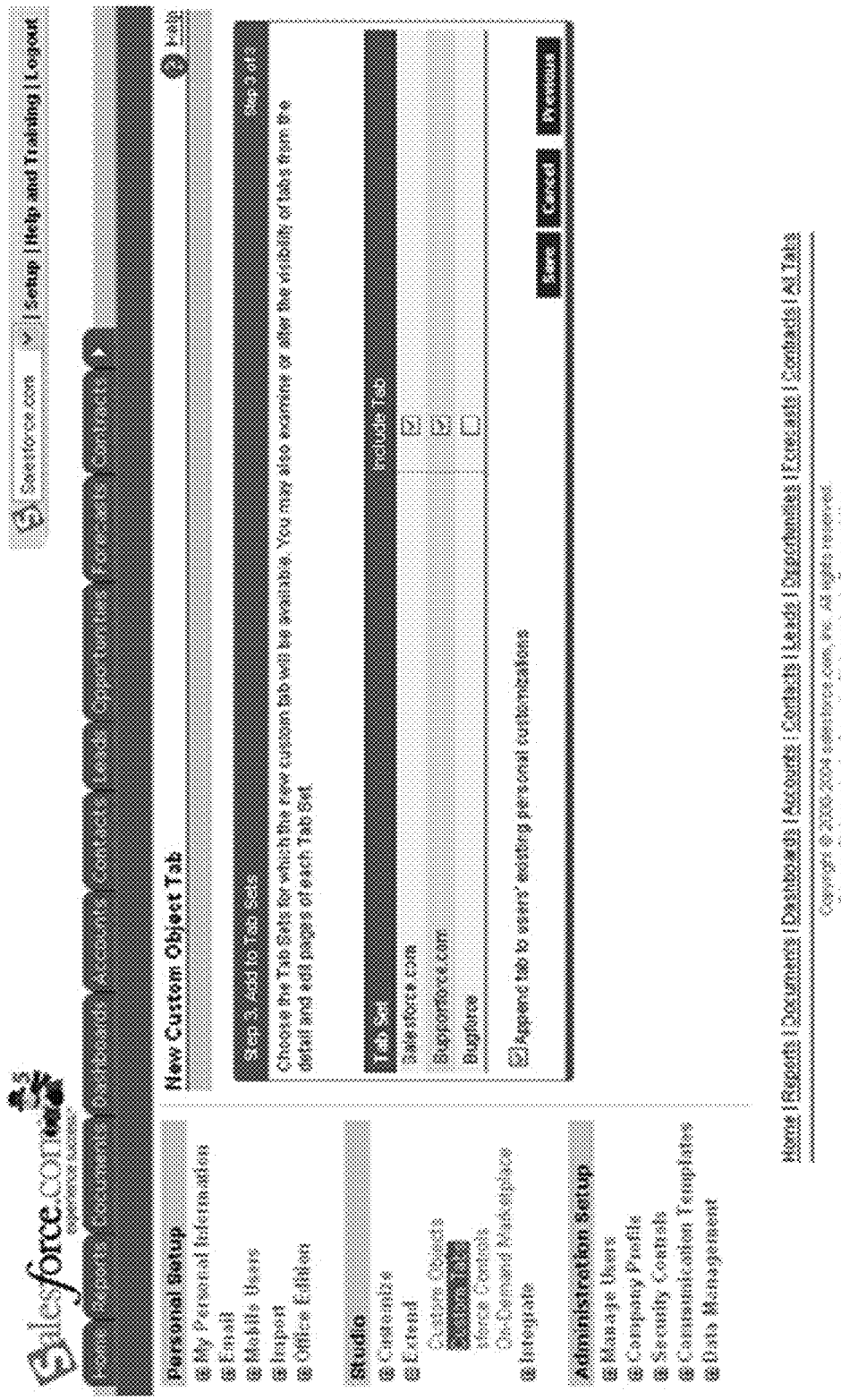
FIG. 17 shows an example of a wizard page including an additional step for the New action for both Custom Object Tabs and Web Tabs.

According to one aspect, an additional last step is added to the wizards for the New action for both Custom Object Tabs and Web Tabs, as shown in FIG. 17. In this step, the user specifies in which tab sets the new tab is visible, and whether or not this new tab should be appended to users' existing personal customizations.

In one aspect, a new "Tab Set Settings" section is added to each Profile object, listing all the tab sets and specifying, for the profile, which users may see the tab set, and which tab set should be selected the first time a user logs on (from then on, the tab set that is selected when a user logs on is preferably the same as the tab set that was selected when the user last logged off). As shown in the Profile Edit page of FIG. 19, visibility of a tab set is indicated by a check box (since users may have access to more than one tab set), but which tab set should be initially selected is specified by a radio button (there may only be one default tab set). FIG. 18 shows an example of a Profile Detail Page showing details of the selections as were made in the Profile Edit Page of FIG. 19.

Server Side Operations and Data Model Definitions

Logo

In one aspect, a logo part can be overridden by a user's tab set definition. An image provided by a user is preferably stored "in document", e.g., in a document storage module or facility that allows customers to store any document types they like. For example, the logo is stored as a document, which is then referenced by the wizard used when creating a new tab set. An HTML IMG tag is then automatically generated which points to (via a URL) the logo in the document store facility. It is preferred that a restriction be set on the rectangular size of the image, otherwise a user adversely impact the UI by posting large images, e.g., huge .gif files. Therefore, in one aspect, depending on the size of the image provided, the image may be clipped or scaled. For example, the example below will clip an image if it is bigger than 55 pixels in height.

```
<div style="position:absolute;height:55px; overflow:hidden; ">
    <img border=0 src="xxx.gif">
</div>
```

Tab Selector

In one aspect, the available values in a tab selector are defined in each profile, with a default. Each user belongs to a profile, which is used to help simplify the administration of a group of users. The default tab is used when user logs in to the system. If there is only one tab set in the user's profile, the user will not see the selector. In certain aspects, session cookies are used to maintain the current selection of the tab selector 120 until the user logs out. Saving a user preference into the database is another way to maintaining the user's selection.

Multi-Browser Operation

Even if a user opens two (or more) browser windows to access the host system, selection of the each tab selector (i.e., tab set selection) is preferably maintained for each browser. In this case, it would be desirable if each browser instance that shares the same session had its own cookie. However, there is no easy way to generate a browser-instance specific cookie id. In one aspect, to resolve this case, every selection change on a tab selector immediately calls an application server to reload. When tab set selection occurs, a session cookie is set and sent back to the server. The session cookie may then be set again to make sure the value is properly passed to the server.

User Preference

A user can edit each tab set they have permission to view, by customizing which tabs are in the tab set, as well as the order of the tabs. Tabs that a user can choose to display are preferably not limited to the current tab set, but rather to all tabs that they can see which are defined in a stored profile. Tabs that are marked as "Hidden" in a user's profile, however, are not selectable.

Design

In-Memory Data Structure

Since the tab set selector and tabs are referred by almost every page, in one aspect, tab set information is preferably cached in the relevant database tables. Required information may include, for example, 1) each tab set (w/array of tabs), 2) Set of Tab Set (for constructing Tab Set Selector in Profile) and 3) Set of TabSet (subset of master tab set) for user preference.

Tab Set

Each tab set contains a name, description, image and list of tabs, with no default. This information is not specific to a given user, but exists across an entire organization or tenant, and is stored in a database table that is shared across an entire organization (but is not shared across organizations). There are two types of tab sets: standard tab sets and custom tab sets. Standard tab sets are defined by the host system, e.g., salesforce.com, and users are limited in their ability to customize the standard tab sets.

Below is an example of useful Java class definitions and database table definitions to define the Tab Set data structures:

```
class TabSetInfo implements Serializable
    String id;
    int type;        // 0: Custom, >0: Standard
    String masterLabel;
    String documentId;
    String[ ] tabs;
```

In one aspect, the tab sets initially provided to a tenant are defined in a template, and therefore different tenants can start with different tab sets, and those tab sets can be configured with different tabs.

In one aspect, each user is mapped to a "profile", which determines the permissions, including tab set visibility, for all the users in that profile. To manage this information, a relation is defined as a list of TabSets with a default flag and is held in a database table:
ProfileInfo:

```
String[ ] tabSetIds;    // array of TabSetInfo IDs.
int defaultTabSetIndex; // index in tabSetIds
```

Because users can also customize their tab sets, the user's customizations are stored in a database table in one aspect.

API Considerations

In addition to making tab sets available via a web browser, in certain aspects tab sets are also available via a Web Services (SOAP/HTTP) API, and can therefore be implemented via other client software, including an offline browser, a wireless client, etc. When translated to Java, one example of a useful API is as follows:

```
public DescribeTabSetResult[ ]  describeTabs( )
    throws RemoteException, UnexpectedErrorFault;
```

Note that the result is an array of DescribeTabSetResult objects, which are defined, when translated to Java, as follows:

```
public class DescribeTabSetResult   implements java.io.Serializable {
    private java.lang.String label;
    private java.lang.String logoUrl;
    private boolean selected;
    private com.sforce.soap.partner.DescribeTab[ ] tabs;
    public DescribeTabSetResult( ) {
    }
    public java.lang.String getLabel( ) {
        return label;
    }
    public java.lang.String getLogoUrl( ) {
        return logoUrl;
    }
```

```
    public boolean isSelected( ) {
        return selected;
    }
    public com.sforce.soap.partner.DescribeTab[ ] getTabs( ) {
        return tabs;
    }
    public void setTabs(com.sforce.soap.partner.DescribeTab[ ] tabs) {
        this.tabs = tabs;
    }
};
```

Finally, this class includes references to a list of DescribeTab objects, which can be defined in Java as follows:

```
public class DescribeTab   implements java.io.Serializable {
    private boolean custom;
    private java.lang.String label;
    private java.lang.String sobjectName;
    private java.lang.String url;
    public DescribeTab( ) {
    }
    public boolean isCustom( ) {
        return custom;
    }
    public java.lang.String getLabel( ) {
        return label;
    }
    public java.lang.String getSobjectName( ) {
        return sobjectName;
    }
    public java.lang.String getUrl( ) {
        return url;
    }
};
```

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A non-transitory computer-readable storage medium storing computer-readable code which, when executed, implements a browser application comprising:
    a content display portion including:
        a content portion for displaying page content information; and
        a content control portion that is separate from a browser control portion and is for displaying content control information,
    wherein the content control portion is adjacent and above the content portion and provides the content control information as a user customizable user interface for controlling the page content information, such that a user of the browser application specifies a portion of the content control information provided as the user customizable user interface, the specified portion of the content control information being associated with a profile of the user,
    wherein the user customizable user interface comprises controls including a subset of selected contents, which are selected controls distributed in a single line near a top of the content display portion, wherein the user specifies the portion of the content control information provided as the user customizable user interface using dueling listboxes, wherein a first listbox of the dueling listboxes includes a set of all contents that are available to be specified as the portion of the content control information provided as the user customizable user interface, the set of all contents not including the subset of selected contents, wherein a second listbox of the dueling listboxes includes the subset of selected contents, which are the controls selected, by the user, from the set of all contents included in the first listbox to specify the portion of the content control information provided as the user customizable user interface, and wherein the dueling listboxes are displayed in the content portion that is for displaying page content information.

2. The non-transitory computer-readable storage medium of claim 1, wherein one or more of back, forward address field and search navigation are provided by the browser control portion.

3. The non-transitory computer-readable storage medium of claim 1, wherein the selected controls comprise one or more tabs.

4. The non-transitory computer-readable storage medium of claim 3, wherein the one or more tabs are displayed separately from the browser control portion.

5. The non-transitory computer-readable storage medium of claim 3, wherein at least one of the selected controls is displayed using different display characteristics when in a selected or de-selected state.

6. The non-transitory computer-readable storage medium of claim 1, wherein:
the content display portion includes tab set user interface controls;
a tab visually represents a user interface into an element of an application or database object; and
the content display portion provides a control for selecting one or more tab sets, each tab set including a group of related tabs that work as a unit to provide application functionality.

7. The non-transitory computer-readable storage medium of claim 6, wherein the control for selecting comprises a drop-down list or a pick list.

8. The non-transitory computer-readable storage medium of claim 1, wherein a display size of at least one of the selected controls is configured to change corresponding to a selected or deselected state of the control.

9. The non-transitory computer-readable storage medium of claim 1,
wherein the selected controls enable the user to switch between different content and are configurable to include an icon, and
wherein the icon is determined by a website and corresponds with a website brand of the web site.

10. The non-transitory computer-readable storage medium of claim 1, wherein the content display portion is configurable to display no other navigation appearing above the selected controls that are distributed along the single line.

11. The non-transitory computer-readable storage medium of claim 1, wherein the selected controls are distributed from left-to-right along the single line.

12. The non-transitory computer-readable storage medium of claim 1, wherein an appearance of at least some controls along the single line is user-customizable.

13. The non-transitory computer-readable storage medium of claim 1, wherein the content display portion provides one or more controls for users to organize at least some of the controls along the single line.

14. The non-transitory computer-readable storage medium of claim 13, wherein the content display portion provides one or more controls to edit included controls, control combination and order of the at least some of the controls along the single line.

15. The non-transitory computer-readable storage medium of claim 1, wherein the content display portion provides a control for displaying selected sets of controls along the single line.

16. The non-transitory computer-readable storage medium of claim 1, wherein the content display portion provides for displaying a grouping of controls as being spaced apart from other of the controls.

17. The non-transitory computer-readable storage medium of claim 16, wherein the grouping of controls is positioned in an upper-right-hand corner of a screen.

18. The non-transitory computer-readable storage medium of claim 1, wherein:
the content display portion provides controls for implementing more than one application; and
a grouping of controls is persisted across more than one application.

19. The non-transitory computer-readable storage medium of claim 18, wherein controls in the grouping of controls are provided as a control type having different display characteristics from those of the subset of selected controls.

20. The non-transitory computer-readable storage medium of claim 1, wherein the content display portion includes separating indicators separating at least two controls.

21. The non-transitory computer-readable storage medium of claim 1, wherein the subset of selected controls is positioned so as to be displaced from a top of the content control portion by optionally displayed control area elements.

22. The non-transitory computer-readable storage medium of claim 1, wherein at least a portion of the content control portion is shaded.

23. The non-transitory computer-readable storage medium of claim 1, wherein the content display portion provides for displaying sets of controls corresponding to more than one application.

24. The non-transitory computer-readable storage medium of claim 23,
wherein the more than one application is hosted by a common host,
wherein a graphic is optionally provided for more than one application, and
wherein a graphic is displayed in conjunction with a selected application.

25. The non-transitory computer-readable storage medium of claim 23, wherein a host logo is displayed in conjunction with one or more of the applications.

26. The non-transitory computer-readable storage medium of claim 1, wherein:
the content display portion provides for displaying sets of controls corresponding to more than one application; and
if a user selects an application in one browser or browser window and opens a second browser or browser window, the application is also selected for the second browser or browser window.

27. The non-transitory computer-readable storage medium of claim 1, wherein the content display portion includes no other navigation controls that appear above the selected controls that are distributed along the single line.

28. The non-transitory computer-readable storage medium of claim 1,
- wherein the profile of the user is one of an end user profile and an administrator profile, and
- wherein contents of the portion of the content control information that are available to be specified by the user are dependent upon whether the profile of the user is the end user profile or the administrator profile.

29. A method of executing computer-readable code to perform a method comprising:
- implementing a browser application comprising:
  - a content display portion including:
    - a content portion for displaying page content information; and
    - a content control portion that is separate from a browser control portion and is for displaying content control information,
- wherein the content control portion is adjacent and above the content portion and provides the content control information as a user customizable user interface for controlling the page content information, such that a user of the browser application specifies a portion of the content control information provided as the user customizable user interface, the specified portion of the content control information being associated with a profile of the user,
- wherein the user customizable user interface comprises controls including a subset of selected contents, which are selected controls distributed in a single line near a top of the content display portion,
- wherein the user specifies the portion of the content control information provided as the user customizable user interface using dueling listboxes,
- wherein a first listbox of the dueling listboxes includes a set of all contents that are available to be specified as the portion of the content control information provided as the user customizable user interface, the set of all contents not including the subset of selected contents,
- wherein a second listbox of the dueling listboxes includes the subset of selected contents, which are the controls selected, by the user, from the set of all contents included in the first listbox to specify the portion of the content control information provided as the user customizable user interface, and
- wherein the dueling listboxes are displayed in the content portion that is for displaying page content information.

30. The method of claim 29, wherein the content control portion comprises controls serving as user interfaces into respective elements of at least one downloaded custom designed application.

31. The method of claim 29, wherein one or more of back, forward address field and search navigation are provided by the browser control portion.

32. The method of claim 29, wherein the selected controls include controls that enable a user to switch between different content as the page content information and that comprise one or more tabs.

33. The method of claim 32, wherein:
- the browser control portion provides an input field and comprises an address bar;
- at least one of the one or more tabs is configured to display a customizable control image; and
- the customizable control image includes a user-selectable icon.

* * * * *